(12) United States Patent
Mizuno et al.

(10) Patent No.: US 6,937,797 B2
(45) Date of Patent: Aug. 30, 2005

(54) PLANAR LIGHTWAVE CIRCUIT AND OPTICAL CIRCUIT

(75) Inventors: Takayuki Mizuno, Mito (JP); Tsutomu Kitoh, Mito (JP); Yasuyuki Inoue, Mito (JP); Yoshinori Hibino, Mito (JP); Mikitaka Itoh, Mito (JP); Takashi Saida, Mito (JP); Yasuhiro Hida, Hitachinaka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 16 days.

(21) Appl. No.: 09/950,635

(22) Filed: Sep. 13, 2001

(65) Prior Publication Data

US 2002/0154863 A1 Oct. 24, 2002

(30) Foreign Application Priority Data

Sep. 13, 2000 (JP) ...................................... 2000-277727
Aug. 24, 2001 (JP) ...................................... 2001-254990

(51) Int. Cl.[7] .............................. G02B 6/26; G02B 6/12
(52) U.S. Cl. .......................................... 385/43; 385/14
(58) Field of Search .............................. 385/14, 39, 43, 385/49, 50, 129–132

(56) References Cited

U.S. PATENT DOCUMENTS

| | | | | |
|---|---|---|---|---|
| 4,431,187 A | * | 2/1984 | Rumble et al. | 473/323 |
| 5,577,141 A | | 11/1996 | Adar et al. | |
| 5,629,999 A | | 5/1997 | Henry et al. | |
| 5,987,046 A | * | 11/1999 | Kobayashi et al. | 372/45 |
| 6,195,478 B1 | * | 2/2001 | Fouquet | 385/17 |
| 6,253,003 B1 | | 6/2001 | Nakamura | 385/28 |
| 6,293,688 B1 | * | 9/2001 | Deacon | 362/556 |
| 6,310,995 B1 | * | 10/2001 | Saini et al. | 385/28 |
| 6,557,766 B1 | * | 5/2003 | Leighton | 235/488 |
| 6,631,225 B2 | * | 10/2003 | Lee et al. | 385/28 |
| 6,633,705 B2 | * | 10/2003 | Ambrosy et al. | 385/43 |
| 2003/0007766 A1 | * | 1/2003 | Galarza et al. | 385/132 |

FOREIGN PATENT DOCUMENTS

| | | | | |
|---|---|---|---|---|
| JP | 63-280202 | 11/1988 | | |
| JP | 5-60928 | 3/1993 | | |
| JP | 8-171020 | 7/1996 | | |
| JP | 08171020 A | * 7/1996 | ............ | G02B/6/00 |
| JP | 8-262244 | 10/1996 | | |
| JP | 8-262245 | 10/1996 | | |
| JP | 11-52168 | 2/1999 | | |
| JP | 11-160556 | 6/1999 | | |
| JP | 2000137129 A | * 5/2000 | ............ | G02B/6/122 |
| JP | 2001-254990 | 9/2001 | | |

OTHER PUBLICATIONS

T. Nakamura et al. "Spot–Size Converted Laser Diodes based on Mode Interference" Kansai Electronics Research Laboratory, NEC Corporation, p. 310.

(Continued)

*Primary Examiner*—Akm Enayet Ullah
*Assistant Examiner*—Sarah Song
(74) *Attorney, Agent, or Firm*—Kenyon & Kenyon

(57) ABSTRACT

A planar lightwave circuit is provided. The planar lightwave circuit includes a waveguide and a spotsize converter which is a part of the waveguide, wherein a core is embedded in a cladding in the waveguide, and the spotsize converter is located near an end face of a substrate on which the planar lightwave circuit is formed, the spotsize converter including: a core width fine-tuning part in an end face side of the substrate; and a core width converting part which follows the core width fine-tuning part; wherein core width of the spotsize converter is minimum at an end face of the substrate, a mean taper angle $\theta_1$ of the core width fine-tuning part is larger than 0° and smaller than a mean taper angle $\theta_2$ of the core width converting part.

31 Claims, 30 Drawing Sheets

OTHER PUBLICATIONS

Park, et al, "Novel Design Concept of Waveguide Mode Adapter for Low–Loss Mode Conversion", IEEE Photonics Technology Letters, V.13, No. 7, Jul. 2001, pp. 675–677.

Kasaya, et al., "A Simple Laterally Tapered Waveguide for Low–Loss Coupling to Single–Mode Fibers", IEEE Photonics Technology Letter, V.5, No. 3, Mar. 1993.

Mizuno, et al., "Spot Size Conversion Using Narrow Tapered Structure on Super High ΔPLC", Proceedings of the 2001 Electronics Society Conference of IEICE, Aug. 2001.**

Itoh, et al., "Fiber Coupling Loss in Tapered 1.5% Δ Waveguide", JSAP, Sep. 2000.**

Nishumura, et al., "Laterally Tapered Spot Size Converter for Silica–Based Optical Waveguide with High Δ", JSAP, Mar. 2001.**

P. Doussiere et al. "Tapered active stripe for 1.5-$\mu$m InGaAsP/InP strained multiple quantum well lasers with reduced beam divergence" Applied Physics Leters, vol. 64 No. 5, Jan. 31, 1994, pp. 539–541.

* cited by examiner

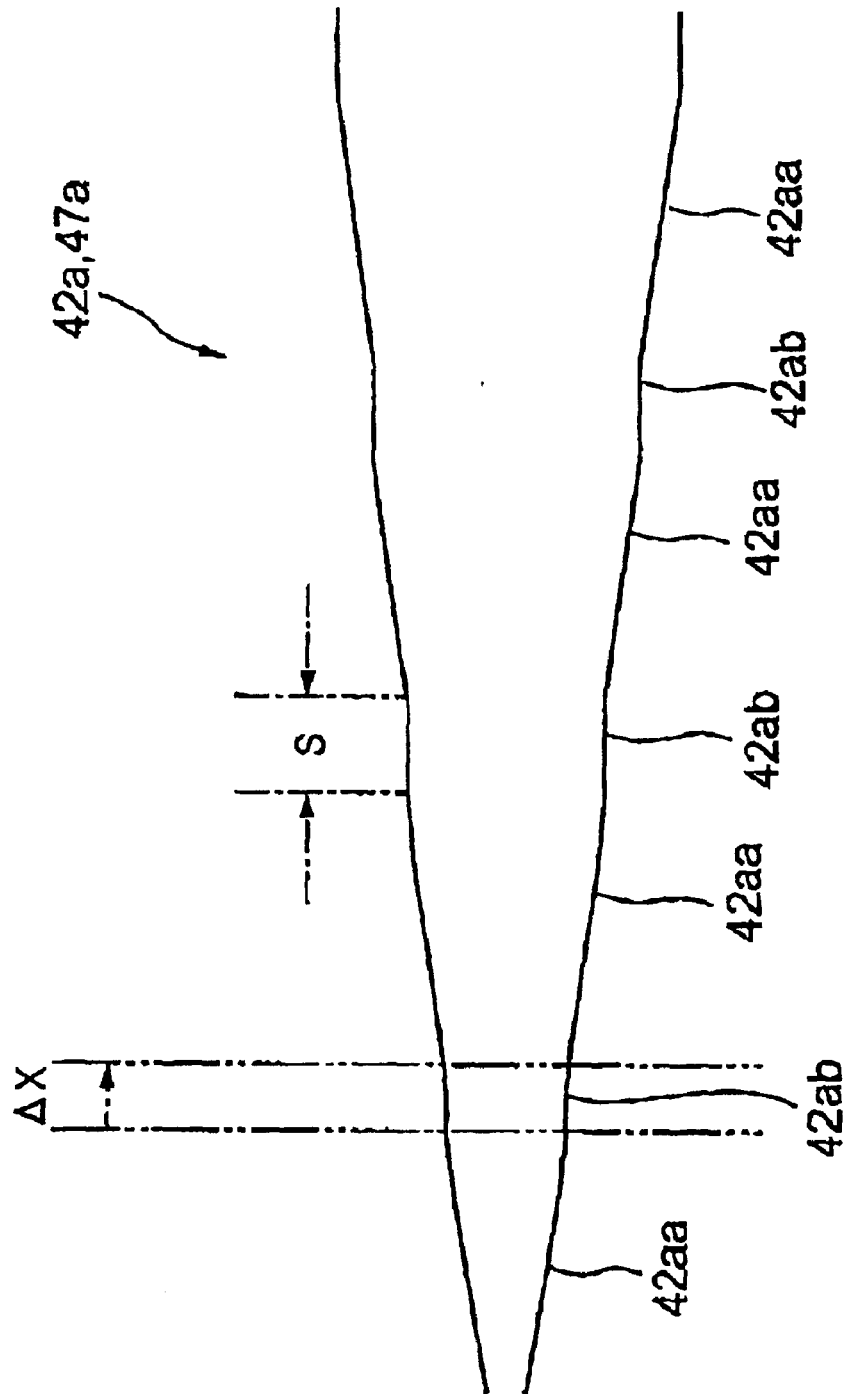

CORE WIDTH FINE-TUNING PART

PLANAR LIGHTWAVE CIRCUIT AND OPTICAL CIRCUIT

BACKGROUND OF THE INVENTION

1. Field of the Invention

The present invention relates to a planar lightwave circuit (PLC) which can decrease the coupling loss between a planar lightwave circuit and an optical fiber or between planar lightwave circuits.

2. Description of the Related Art

It is predicted that the planar lightwave circuits will be used more and more as main parts which have important functions such as routing of an optical signal in superfast large-capacity optical communication systems from now on. Especially, it is required to construct a larger optical communication system as capacity required for communication increases. In order to realize the enlargement of the optical communication system, it is necessary to downsize the planar lightwave circuit and to allow connection between many planar lightwave circuits.

FIG. 1 is a schematic diagram of structure of a conventional planar lightwave circuit. As shown in FIG. 1, an input waveguide 112 is formed on a substrate 111. The input waveguide 112 is connected to a slab waveguide 113 formed on the substrate 111. One end of a plurality of arrayed waveguides 114 formed on the substrate 111 is connected to the slab waveguide 113. A half waveplate 115 which gets rid of polarization dependence is provided at some midpoint of the arrayed waveguides 114. The other end of the arrayed waveguides 114 is connected to a slab waveguide 116 formed on the substrate 111. A plurality of output waveguides formed on the substrate 111 are connected to the slab waveguide 116.

When an optical signal is entered into the planar lightwave circuit 110 from the input waveguide 112, the optical signal is entered into the arrayed waveguides 114 via the slab waveguide 113 and polarization dependence is dissolved by the half waveplate 115. In addition, the optical signal is demultiplexed into signals of various wavelengths in the slab waveguide 116 due to delay line of the arrayed waveguides 114 so that demultiplexed signals are output from the output waveguides 117.

In order to downsize the planar lightwave circuit 110, it is very effective to adopt a waveguide (which will be called a superhigh-$\Delta$ waveguide) in which relative refractive index difference $\Delta$ is a high value which is larger than 1% where relative refractive index difference $\Delta$ is the ratio of difference between the refractive index $n_{core}$ of the core and refractive index $n_{clad}$ of the cladding to the refractive index $n_{core}$ of the core as represented by the following equation (1). The reason is that the higher the relative refractive index difference $\Delta$ is, the more completely the light is confined in the waveguide so that the waveguide can be used even when it is bent by a small bending radius.

$$\Delta = (n_{core} - n_{clad})/n_{core} \tag{1}$$

However, there is a problem in that the coupling loss of the superhigh-$\Delta$ waveguide is very large.

As shown in FIG. 2, when an optical signal which propagates through a core 120a in an optical fiber 120 enters into a core 112a of the input waveguide 112, attenuation of the optical signal, which is called the coupling loss, occurs. The coupling loss occurs when connecting different types of waveguides The coupling loss occurs due to difference of field distribution between the different types of waveguides, and the coupling loss accumulates as connecting points increases. For example, as for 1.5 $\mu$m wavelength which is used in an optical communication system, large coupling loss about 3.5 dB occurs between a single-mode optical fiber of core diameter 9 $\mu$m and a superhigh-$\Delta$ waveguide about 5 $\mu$m per side.

In the planar lightwave circuit 110 used in the optical communication system, downsizing and decreasing of the coupling loss are mutually contradictory. That is, although the circuit can be downsized by increasing $\Delta$, the coupling loss increases. Therefore, construction of a practical system has limitations That is, it becomes difficult to enlarge capacity of transmission lines unless the coupling loss of the superhigh-$\Delta$ waveguide is decreased, so that functions and scale of the optical communication system may be limited.

As a method for decreasing the coupling loss between the superhigh-$\Delta$ waveguide and the optical fiber, use of a spotsize converter in which core width is narrowed toward an end face of a substrate is known as shown in FIG. 3 (for example, Japanese laid-open patent application No.63-280202).

There is an region in which a spotsize is widened when the core width is narrowed to some extent. Then, it becomes possible to decrease the coupling loss by adjusting the widened field distribution with that of an optical fiber.

However, it is known that the coupling loss for the narrow taper spotsize converter largely changes due to slight fabrication error of core width, $\Delta$ and the like. Thus, the narrow taper spotsize converter has not been in practical use.

SUMMARY OF THE INVENTION

It is an object of the present invention to provide a planar lightwave circuit which can suppress the coupling loss while downsizing is realized.

More particularly, it is an object of the present invention to provide a planar lightwave circuit and an optical circuit which use a narrow taper spotsize converter which has large fabrication tolerance.

The above object of the present invention is achieved by a planar lightwave circuit in which an input waveguide and an output waveguide are formed on a substrate wherein each of the input waveguide and the output waveguide are formed by a core and a cladding which covers the core, and refractive index of the core is higher than refractive index of the cladding, wherein:

a core width of each of an input end side of the input waveguide and an output end side of the output waveguide changes gradually toward an end face of the substrate.

In the planar lightwave circuit, a taper part is formed in the core in each of the input end side of the input waveguide and the output end side of the output waveguide, and a taper angle of the taper part is larger than 0° and equal to or smaller than 5°.

In the planar lightwave circuit, steps are formed in the core in each of the input end side of the input waveguide and the output end side of the output waveguide.

In the planar lightwave circuit, height between adjacent steps in the steps is larger than 0 $\mu$m and equal to or smaller than 5 $\mu$m.

In the planar lightwave circuit, taper parts and straight parts are formed alternately in the core in each of the input end side of the input waveguide and the output end side of the output waveguide, core width of each of the taper parts changes gradually toward an end face of the substrate and core width of each of the straight parts is constant.

In the planar lightwave circuit, length of each of the straight parts is equal to or larger than 1 $\mu$m.

In the planar lightwave circuit, a marker is provided for indicating a cutting position of the input waveguide or the output waveguide, or indicating a position where the core width changes.

The planar lightwave circuit may include a monitor waveguide in which an input end of the monitor waveguide is formed in an end face side of the substrate which is different from end face sides in which the input end of the input waveguide and the output end of the output waveguide are provided, wherein the monitor waveguide includes a core which is formed such that core width changes toward an end face of the substrate.

In addition, the planar lightwave circuit may include a monitor waveguide, wherein an input end of the monitor waveguide is formed in an end face side of the substrate in which the input end of the input waveguide is located, and an output end of the monitor waveguide is formed in an end face side of the substrate in which the output end of the output waveguide is located, wherein shapes of an input end side and an output end side of the monitor waveguide are similar to the input end side of the input waveguide and the output end side of the output waveguide respectively.

In the planar lightwave circuit, the substrate is made of silicon and the input waveguide and the output waveguide are made of silica-based glass The object of the present invention is also achieved by an optical circuit which includes a waveguide and a spotsize converter which is a part of the waveguide, wherein a core is embedded in a cladding in the waveguide, and the spotsize converter is located near an end face of a substrate on which the optical circuit is formed, the spotsize converter including:

alternating taper parts and straight parts;

wherein core width of each of the taper parts decreases toward an end face of the substrate and core width of each of the straight parts is constant.

In the optical circuit; an optimized taper is used as a shape of the taper part.

In addition, the object of the present invention is achieved by an optical circuit which includes a waveguide and a spotsize converter which is a part of the waveguide, wherein a core is embedded in a cladding in the waveguide, and the spotsize converter is located near an end face of a substrate on which the optical circuit is formed, the spotsize converter including:

a plurality of straight parts via steps, core width of each straight part being constant;

wherein core width of the spotsize converter is minimum at an end face of the substrate, and a height of the step is larger than 0 $\mu$m and equal to or smaller than 5 $\mu$m.

In the optical circuit, a length of the straight part is equal to or larger than 1 $\mu$m.

In the optical circuit, a mean taper angle of the spotsize converter is larger than 0° and equal to or smaller than 5°.

The object of the present invention is also achieved by an optical circuit which includes a waveguide and a spotsize converter which is a part of the waveguide, wherein a core is embedded in a cladding in the waveguide, and the spotsize converter is located near an end face of a substrate on which the optical circuit is formed, the spotsize converter including:

a core width fine-tuning part in an end face side of the substrate; and a core width converting part which follows the core width fine-tuning part;

wherein core width of said spotsize converter is minimum at an end face of said substrate, a mean taper angle $\theta_1$ of the core width fine-tuning part is larger than 0° and smaller than a mean taper angle $\theta_2$ of the core width converting part.

In the optical circuit, the core width fine-tuning part may include a plurality of taper parts.

In the optical circuit, the core width fine-tuning part may include alternating taper parts and straight parts, core width of each straight part being constant.

In the optical circuit, the core width fine-tuning part may include:

a plurality of straight parts via steps, core width of each straight part being constant;

wherein a height of the step is larger than 0 $\mu$m and equal to or smaller than 5 $\mu$m.

In the optical circuit, an optimized taper is used as a shape of the core width converting part.

In the optical circuit, a mean taper angle $\theta_1$ of the core width fine-tuning part is larger than 0° and equal to or smaller than 0.04°, and a mean taper angle $\theta_2$ of the core width converting part is larger than 0.04° and equal to or smaller than 5°.

In the optical circuit, a marker for forming an end face of the substrate is provided in the optical circuit.

In the optical circuit, the marker is provided in a location corresponding to a location in which a shape of the core width fine-tuning part changes.

In the optical circuit, a monitor waveguide is provided on the substrate, the monitor waveguide including a second spotsize converter including:

a second core width fine-tuning part in an end face side of the substrate; and a second core width converting part which follows the second core width fine-tuning part;

wherein core width of said second spotsize converter is minimum at an end face of said substrate, a mean taper angle $\theta_1$ of the second core width fine-tuning part is larger than 0° and smaller than a mean taper angle $\theta_2$ of the second core width converting part.

The optical circuit includes a plurality of the monitor waveguides, spotsize converters of the monitor waveguides are shifted to each other by a predetermined distance in the direction of the length of the monitor waveguides.

In addition, the optical circuit may include a first monitor waveguide and a second monitor waveguide;

wherein the first monitor waveguide includes a first spotsize converter in an end face side of the substrate which is different from end face sides corresponding to an input end or an output end of the waveguide, the first spotsize converter including:

a first core width fine-tuning part in an end face side of the substrate;

a first core width converting part which follows the first core width fine-tuning part;

wherein core width of said first spotsize converter is minimum at an end face of said substrate, a mean taper angle $\theta_1$ of the first core width fine-tuning part is larger than 0° and smaller than a mean taper angle $\theta_2$ of the first core width converting part;

wherein the second monitor waveguide includes a second spotsize converter in an end face side of the substrate where an input end or an output end of the waveguide is located, the second spotsize converter including:

a second core width fine-tuning part in an end face side of the substrate;

a second core width converting part which follows the second core width fine-tuning part;

wherein core width of said second spotsize converter is minimum at an end face of said substrate, a mean taper angle $\theta_1$ of the second core width fine-tuning part is larger than 0° and smaller than a mean taper angle $\theta_2$ of the second core width converting part.

In addition, the object of the present invention is also achieved by an optical circuit which includes input ports and output ports, each of the input ports and the output ports including:

a waveguide and a spotsize converter which is a part of the waveguide, wherein a core is embedded in a cladding in the waveguide, and the spotsize converter is located near an end face of a substrate on which the waveguide is formed, the spotsize converter including;

a core width fine-tuning part in an end face side of the substrate; and a core width converting part which follows the core width fine-tuning part;

wherein a mean taper angle $\theta_1$ of the core width fine-tuning part is larger than 0° and smaller than a mean taper angle $\theta_2$ of the core width converting part.

BRIEF DESCRIPTION OF THE DRAWINGS

Other objects, features and advantages of the present invention will become more apparent from the following detailed description when read in conjunction with the accompanying drawings, in which:

FIG. 10 is a magnified view of the core of the input waveguide and the output waveguide of the planar lightwave circuit of a third example of a first embodiment of the present invention;

DETAILED DESCRIPTION OF THE PREFERRED EMBODIMENTS

As described in the related art, as for the spotsize converter which uses the narrow taper, fabrication tolerance of core width is very narrow for minimizing the coupling loss between the planar. lightwave circuit and the optical fiber. That is, an optimum value of the core width changes due to fabrication conditions of the relative refractive index difference $\Delta$ between the core and the cladding, core thickness and the like. According to the present invention, the core width of the input waveguide is narrowed toward the end face of the substrate to allow the core width to be fine-tuned so that the optimum core width can be obtained. By adjusting the position of the end face, the optimum core width can be obtained with high reproducibility.

In the following, although each embodiment of the present invention will be described, the present invention is not limited to the embodiments.

[First Embodiment]

FIRST EXAMPLE

Figure 1:
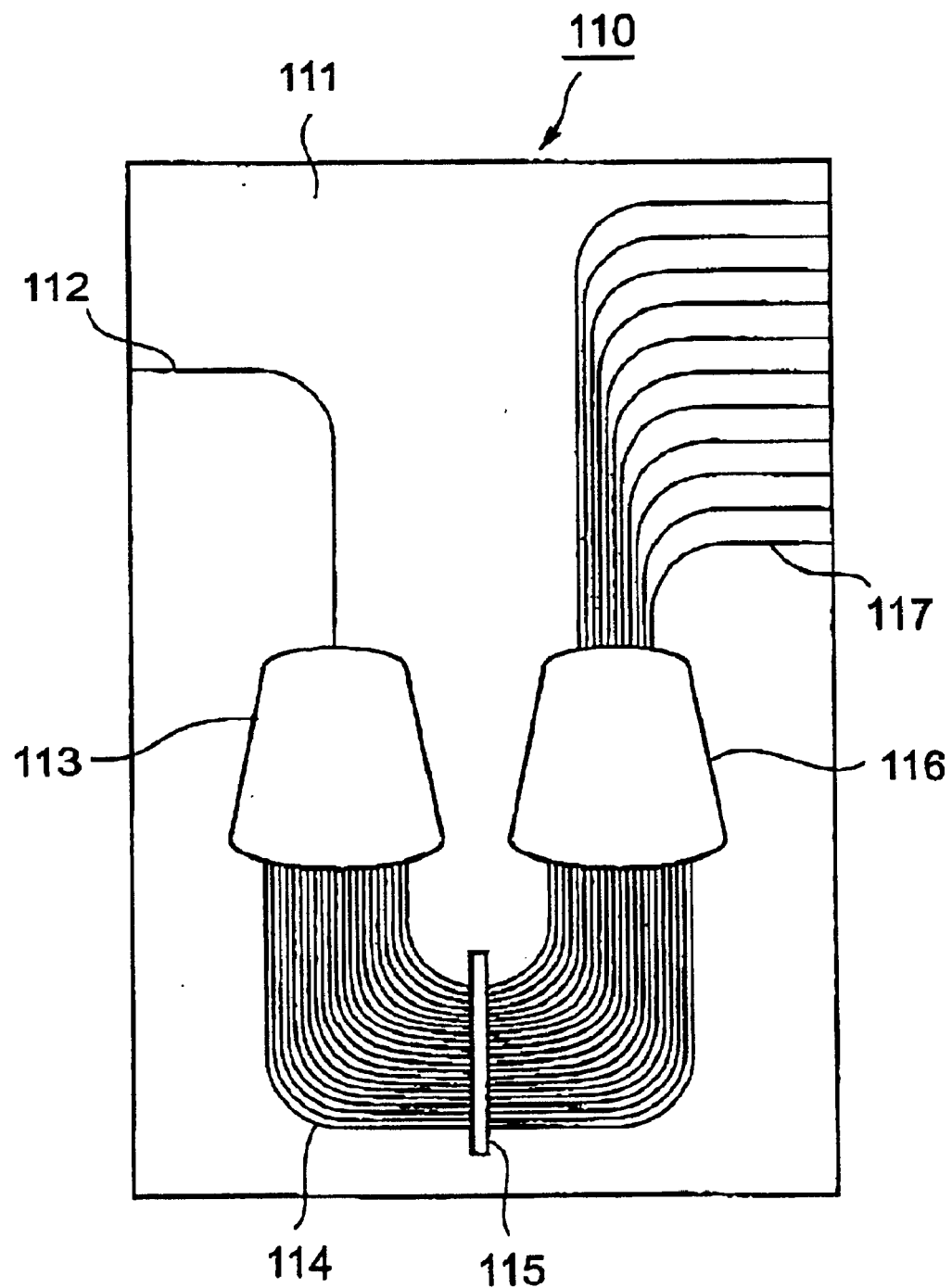
FIG. 1 is a schematic diagram of structure of a conventional planar lightwave circuit.
Figure 2:
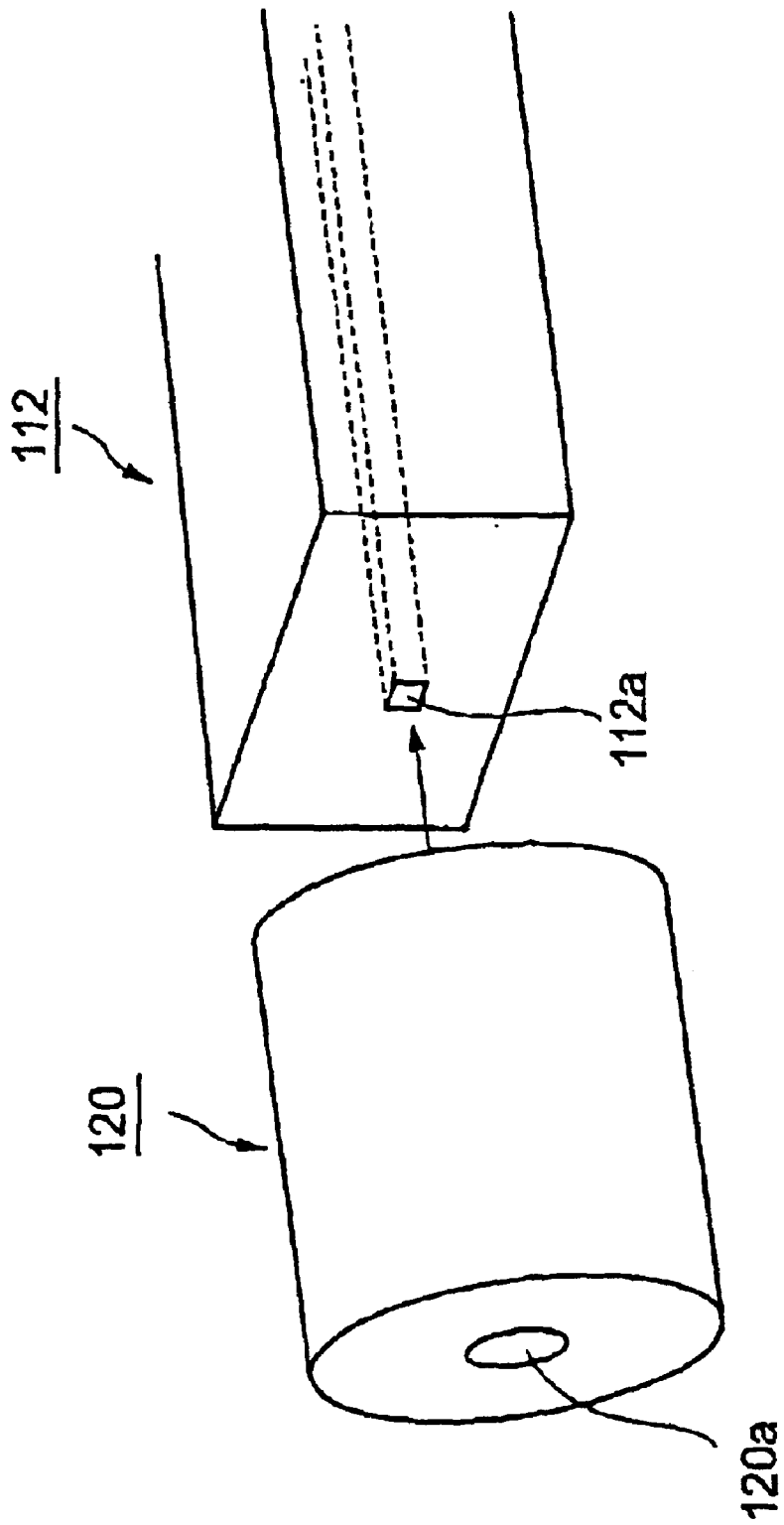
FIG. 2 is a figure for explaining the connection between an input waveguide of a conventional planar lightwave circuit and an optical fiber.
Figure 3:
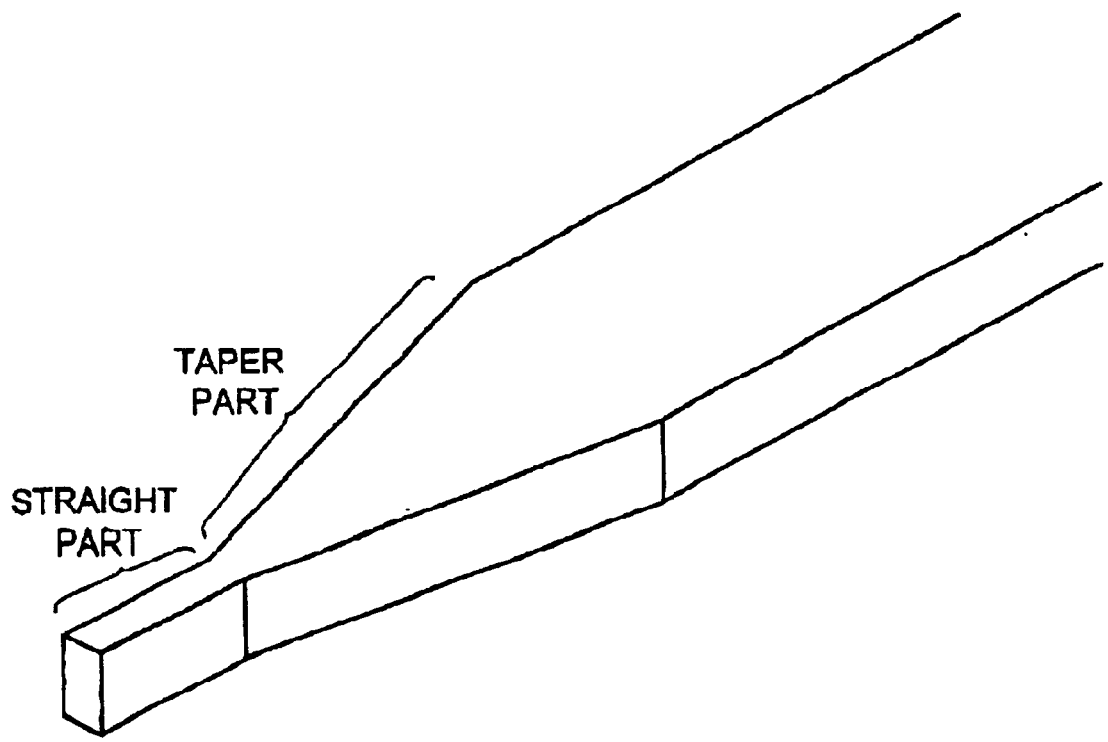
FIG. 3 is an example of a spotsize converter according to a conventional technique.
Figure 4:
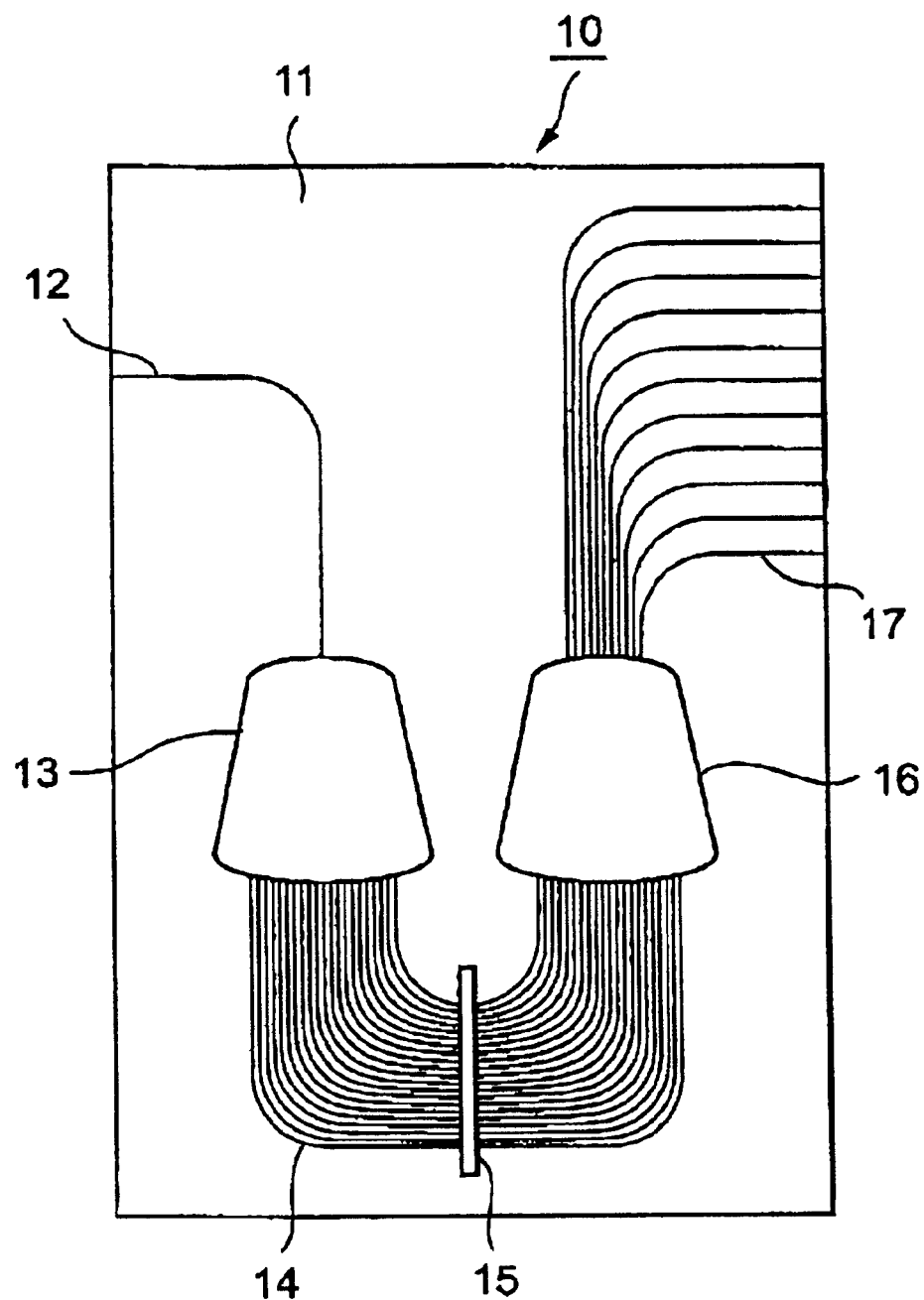
FIG. 4 is a schematic block diagram of a planar lightwave circuit of a first example of a first embodiment of the present invention.
Figure 5:
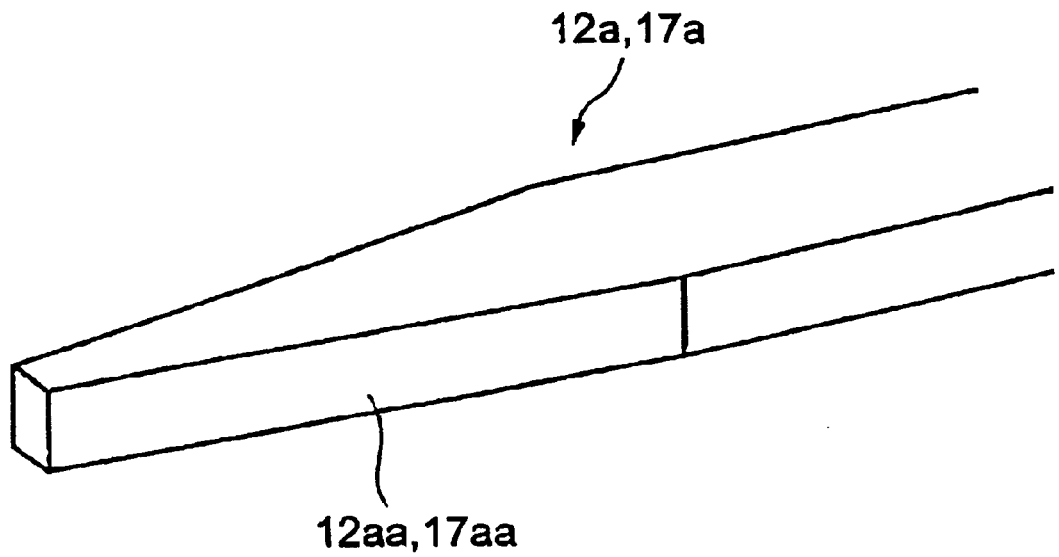
FIG. 5 is a magnified view of the core of the input waveguide and the output waveguide of the planar lightwave circuit of FIG. 4.
Figure 6A:
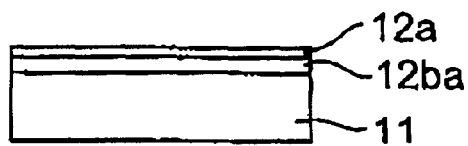
FIGS. 6A–6E are diagrams for explaining a process for fabricating the input waveguide and the output waveguide of the planar lightwave circuit of FIG. 4.
Figure 7:
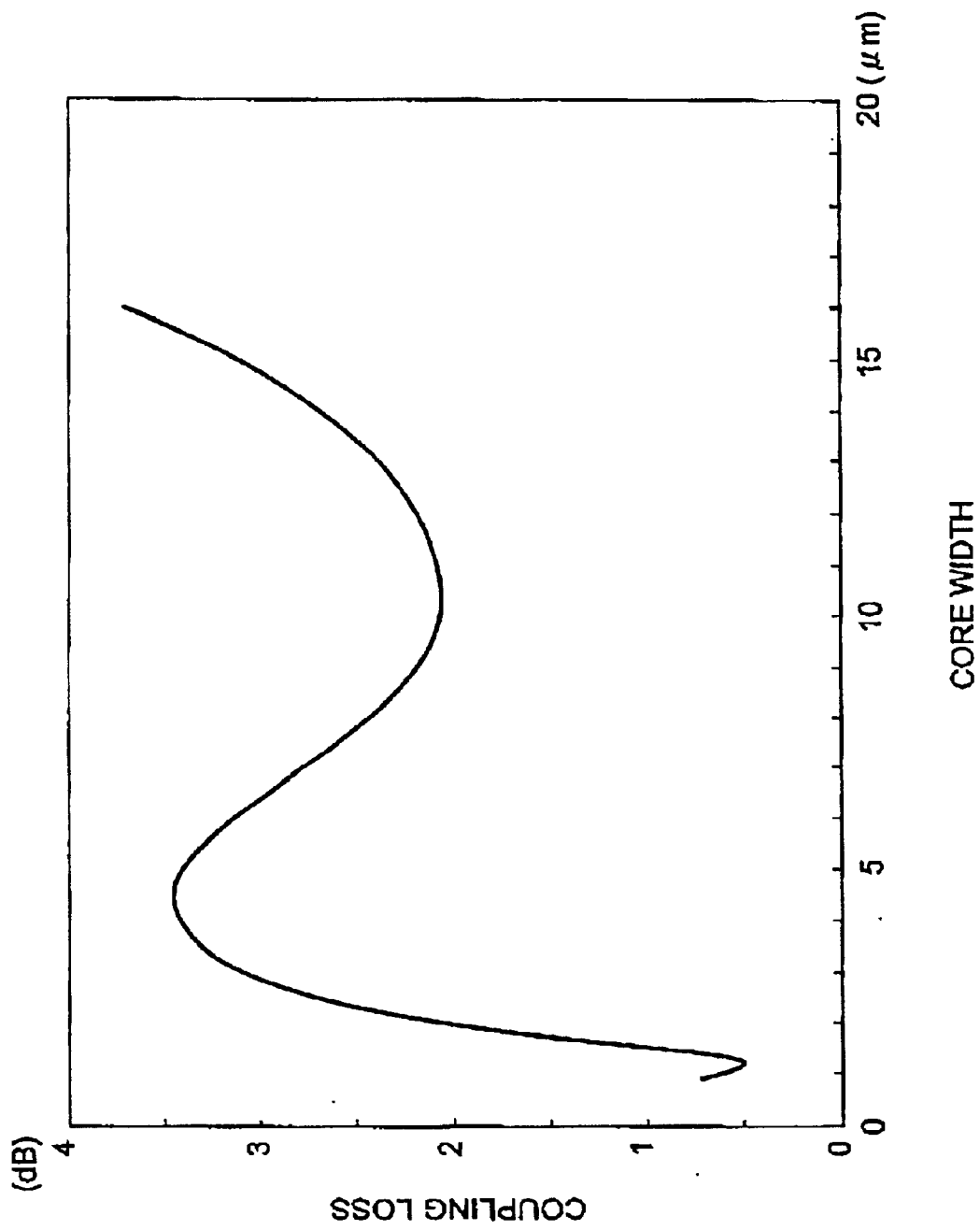
FIG. 7 shows a relationship between the core width and the coupling loss of the end face of the substrate which is obtained by calculation.
Figure 8:
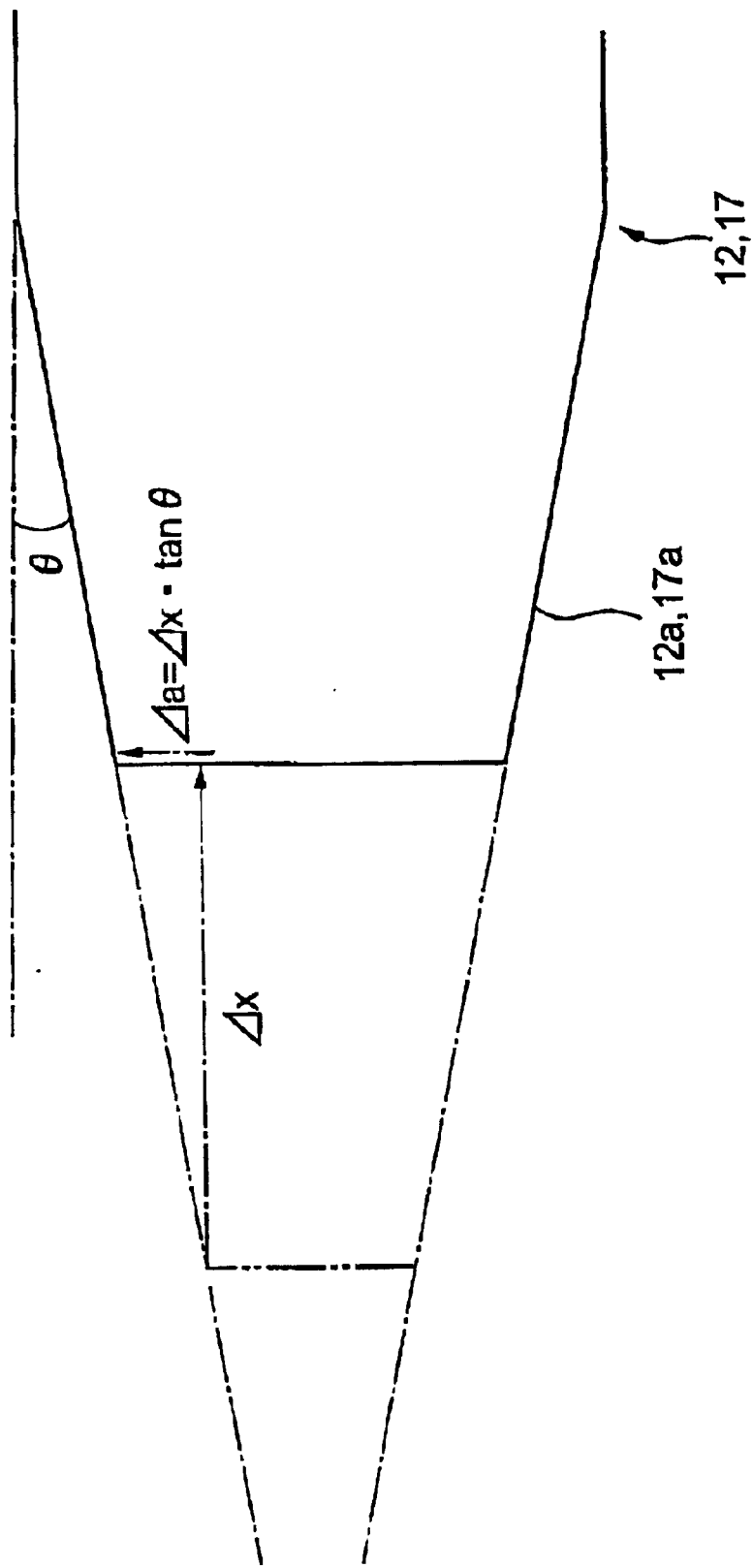
FIG. 8 is a diagram for explaining dicing error.

The first example of the first embodiment of the planar lightwave circuit of the present invention will be described with reference to FIGS. 4–8. FIG. 4 is a schematic block diagram of the planar lightwave circuit, FIG. 5 is a magnified view of the core of the input waveguide and the output waveguide of the planar lightwave circuit of FIG. 4. FIGS. 6A–6E are diagrams for explaining a process for fabricating the input waveguide and the output waveguide of the planar lightwave circuit of FIG. 4. FIG. 7 shows a relationship between the core width and the coupling loss of the end face of the substrate which is obtained by calculation. FIG. 8 is a diagram for explaining dicing error.

As shown in FIG. 4, an input waveguide 12 made of silica-based glass is formed on a substrate 11 made of silicon in which the input waveguide 12 includes a core having high refractive index and a cladding having low refractive index, and the core is covered by the cladding. As shown in FIG. 5, the core 12a of the input waveguide 12 has a taper part 12aa in which the core width decreases gradually toward the input end which is located in the end face side of the substrate 11.

In each embodiment, the part of the waveguide in which the core width decreases gradually from a part near the end face of the substrate toward the end face of the substrate will be called a spotsize converter. For example, the taper part shown in FIG. 5 is a spotsize converter.

As shown in FIG. 4, the input waveguide 12 is connected to a slab waveguide 13 made of silica-based glass. Each one end of arrayed waveguide 14 made of silica-based glass formed on the substrate 11 is connected to the slab waveguide 13. A half waveplate 15 for dissolving polarization dependence is provided at some midpoint of the arrayed waveguides 14. The other ends of the arrayed waveguides 14 are connected to a slab waveguide 16 made of silica-based glass formed on the substrate 11.

Output waveguides 17 made of silica-based glass formed on the substrate 11 are connected to the slab waveguide 16. In the same way as the input wave guide 12, the core 17a of the output waveguide 17 has a taper part 17aa in which the core width decreases gradually toward the output end which is located in another end face side of the substrate 11 as shown in FIG. 5.

The waveguide 12, 17 of the planar lightwave circuit can be fabricated in the following way.

First, undercladding glass soot mainly made of $SiO_2$ is deposited on the substrate 11 made of silicon by a flame hydrolysis deposition (FHD) method. Then, core glass soot in which $GeO_2$ is doped to $SiO_2$ is deposited on the undercladding glass soot by the flame hydrolysis deposition method. After that, high temperature heat-treatment (larger than 1000° C.) is carried out for the glass soot such that the glass soot becomes transparent. Accordingly, an undercladding glass 12ba and a core glass 12a are formed on the substrate 11 (FIG. 6A). Thickness is adjusted such that thickness of the undercladding glass 12ba and the core glass 12a become proper when depositing the glass soot by the flame hydrolysis deposition method.

Figure 6B:
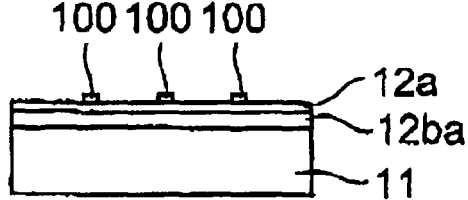
Figure 6C:
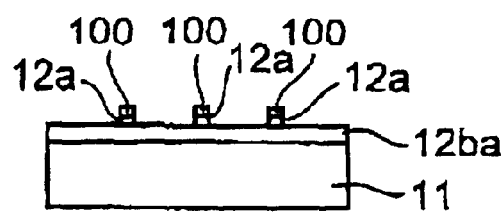
Figure 6D:
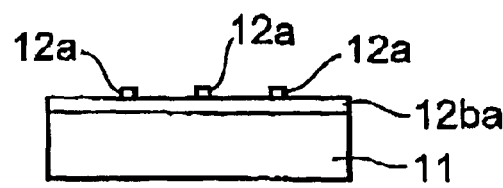

Next, etching masks 100 are formed on the core glass 12a using photolithography such that each etching mask 100 becomes tapered structure, that is, width of each etching mask 100 decreases toward the end face of the substrate 11 (FIG. 6B). After that, patterning of the core glass 12a is performed (FIG. 6C), and the etching masks 100 are removed (FIG. 6D).

Figure 6E:
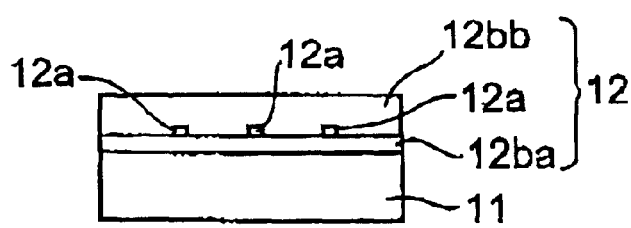

Finally, overcladding glass 12bb mainly made of $SiO_2$ is deposited on the undercladding glass 12ba and the core glass 12a by the flame hydrolysis deposition method so that the overcladding glass 12bb also spreads into a narrow spacing between the adjacent core glasses, wherein dopant such as $B_2O_3$ and $P_2O_5$ is doped in the overcladding glass 12ba so that glass transition temperature is lowered (FIG. 6E). Then, the waveguide 12, 17 can be formed on the substrate 11.

In the planar lightwave circuit 10, when an optical signal in which lights of a plurality of different wavelengths are multiplexed is entered in the input waveguide 12, the optical signal is entered in the arrayed waveguides 14 via the slab waveguide 13, and polarization dependence is dissolved by the half waveplate 15. In addition, the optical signal is demultiplexed into optical signals of the wavelengths in the slab waveguide 16 due to delay line of the arrayed waveguides 14. Then, the optical signals are output from the output waveguides 17.

FIG. 7 shows a relationship between the core width at the end face of the substrate and the coupling loss which is calculated for a single-mode optical fiber of 9 $\mu$m core diameter, in which the core thickness is 5 $\mu$m and $\Delta$ is 1.5%. As is known from this figure, as the core width is decreased gradually from 5 $\mu$m, the spotsize in the waveguide decreases so that the coupling loss increases. However, when the core width becomes smaller than 4 $\mu$m, confinement of light into the core becomes weak and the spotsize is widened so that the coupling loss becomes lowered. When the core width is further decreased, the coupling loss becomes minimum at core width close to 1.2 $\mu$m. However, the coupling loss increases rapidly as the core width decreases below 1.2 $\mu$m. This is because the spotsize rapidly increases since the core width is too narrow.

As shown in FIG. 7, when the core width is 1.2 $\mu$m, the coupling loss reaches its minimum value of approximately 0.5 dB. Thus, the coupling loss can be suppressed to about 1.0 dB in total of both ends of input and output. Since the waveguide is designed such that a single-mode light propagates, width and thickness of the core of the waveguide are determined by the material and the like.

Thus, the taper part 12aa, 17aa is provided in the core 12a, 17a of the waveguide 12, 17 at the end face side of the substrate 11 in the planar lightwave circuit 10 of the first example in this embodiment. Accordingly, the coupling loss is decreased while satisfying propagation conditions of the single-mode light.

As mentioned above, the coupling loss increases rapidly when the core width deviates from 1.2 $\mu$m even slightly. Thus, there is a possibility in that the coupling loss may increase due to deviation from optimum width caused by dicing error of the planar lightwave circuit 10.

As shown in FIG. 8, when assuming that a taper angle of the taper part 12aa, 17aa is θ, and amount of deviation of dicing position is $\Delta x$, deviation amount of one side of the core width can be represented by the following equation (2).

$$\Delta a = \Delta x \cdot \tan \theta \tag{2}$$

For example, when θ is 1.5° and $\Delta x$ becomes 5 $\mu$m (which is normal size of dicing error), $\Delta$ a becomes 0.13 $\mu$m. Therefore, deviation amount of both side 2 $\Delta a$ a becomes 0.26 $\mu$m. Therefore, the core width becomes 1.2±0.26 $\mu$m. Thus, as shown in FIG. 7, the coupling loss becomes about 0.7 dB, which means that the coupling loss is only about 0.2 dB larger than that when $\Delta x$ is 0.

Therefore, if error occurs when dicing the planar lightwave circuit 10, the error does not largely affect the coupling loss so that the planar lightwave circuit 10 of low coupling loss can be always fabricated easily.

It is desirable that the taper angle θ of the taper part 12aa, 17aa of the core 12a, 17a of the waveguide 12, 17 is larger than 0° and equal to or smaller than 5°. Because, if the taper angle θ is 0°, the effect of the present invention can not be obtained, and, if the taper angle is larger than 5°, the deviation amount $\Delta$ a of the core width due to dicing error becomes too large so that the coupling loss becomes too large.

In the above-mentioned planar lightwave circuit 10, silica-based waveguides 11~17 are formed on the silicon substrate 11. However, materials are not limited to these. The waveguides 11~17 which are made of polyimide, silicon, semiconductor, $LiNbO_3$ and the like can be formed on the substrate 11 which is made of various materials.

SECOND EXAMPLE

Figure 9:
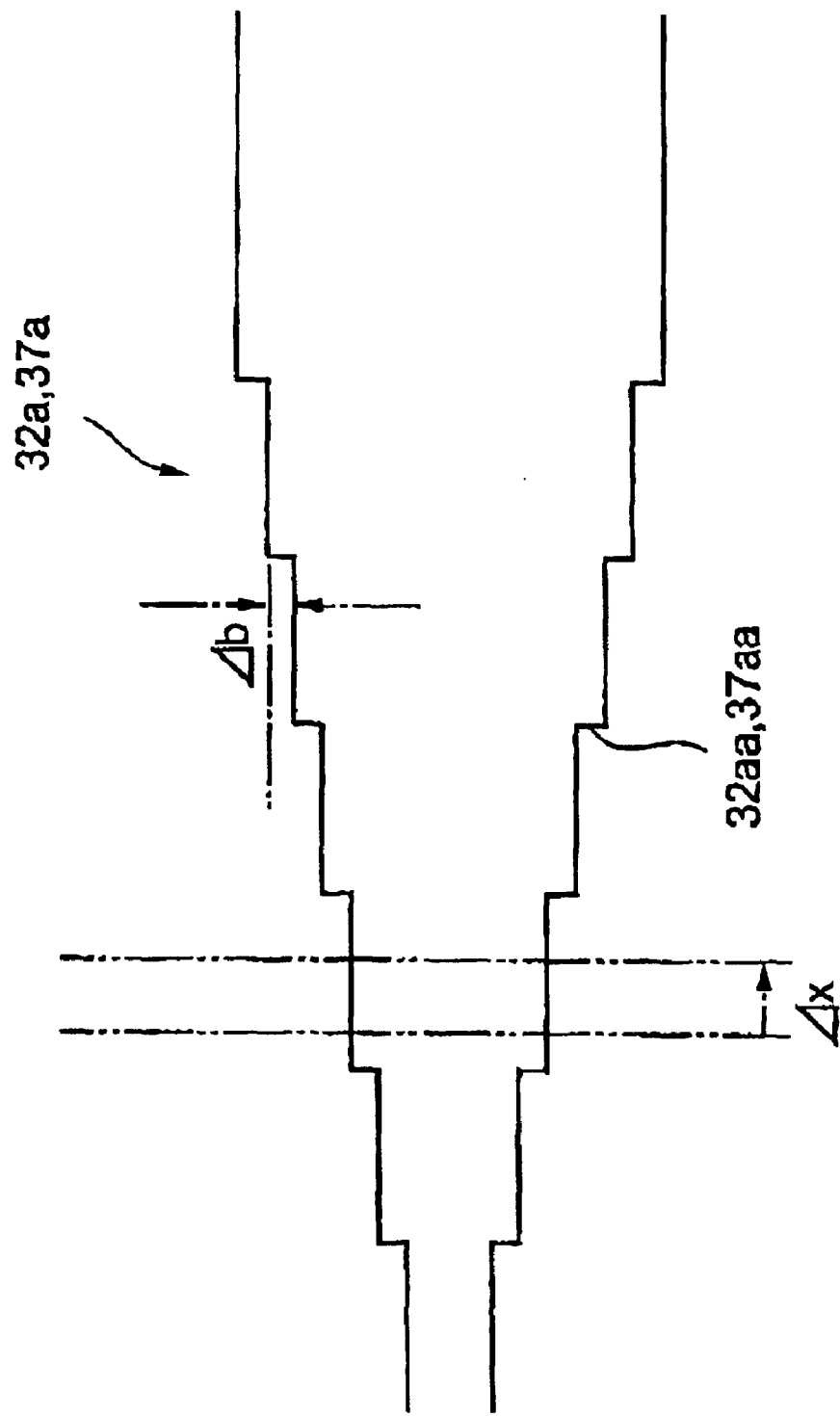
FIG. 9 is a magnified view of the core of the input waveguide and the output waveguide of the planar lightwave circuit of a second example of a first embodiment of the present invention.

Instead of providing a simple taper shown in FIG. 5, a core 32a, 37a shown in FIG. 9 can be provided for example. As for the core 32a, 37a, a plurality of steps 32aa, 37aa are provided such that the core width becomes smaller toward the input end or the output end which is located at the end face side of the substrate 11.

If the number of the steps are increased so as to decrease the height difference $\triangle$b between adjacent steps (in other words, height of perpendicular section of the step), the shape of the core 32a, 37a becomes closer to a taper shape so that the effect of decreasing the coupling loss can be increased. Therefore, it is desirable that the steps 32aa, 37aa are provided as many as possible in consideration of the dicing error $\triangle$x.

That is, when low coupling loss can not be obtained at a dicing position, the waveguide can be used after cutting the substrate at a different position, since the core width becomes smaller toward the input end or the output end by using the steps 32aa, 37aa. Therefore, even when an accurate optimum core width is not known and only an estimated value of an analytic result is obtained, the optimum core width can be searched for by changing the cutting position.

Therefore, by applying the core 32a, 37a, a proper core width can be easily realized even when the dicing error $\triangle$x occurs.

It is desirable that the height difference between the adjacent steps $\triangle$b is larger than 0 $\mu$m and equal to or smaller than 5 $\mu$m. Because, when $\triangle$b is equal to 0 $\mu$m, the effect of the present invention can not be obtained. When $\triangle$b exceeds 5 $\mu$m, the propagation condition of the single-mode light can not be satisfied.

In the example shown in FIG. 9, the height $\triangle$b and the length of the step are fixed for each step. However, the height $\triangle$b and the length of the step may be formed different for each step.

THIRD EXAMPLE

In addition, as shown in FIG. 10, a core 42a, 47a can be used. In the core 42a, 47a, alternating taper parts 42aa, 47aa and straight parts 42ab, 47ab are provided at the input end side or the output end side located in the end face side of the substrate 11, wherein the core width becomes smaller toward the input or output end as for the taper part, and the core width is fixed at a constant width as for the straight part which is formed along the axis of the core.

By applying the core 42a, 47a, the coupling loss can be decreased while the propagation condition of the single-mode light is satisfied. In addition, the dicing error can be absorbed by cutting the substrate at the straight part 42ab, 47ab. Therefore, a proper core width can be realized easily.

It is desirable that the length s of the straight part 42ab, 47ab is equal to or larger than 1 $\mu$m. Because, when s is smaller than 1 $\mu$m, it becomes difficult to absorb dicing error.

As for the example shown in FIG. 10, although the lengths of the taper parts and the straight part are fixed, it is possible to form the core such that the lengths are different.

FOURTH EXAMPLE

Figure 11A:
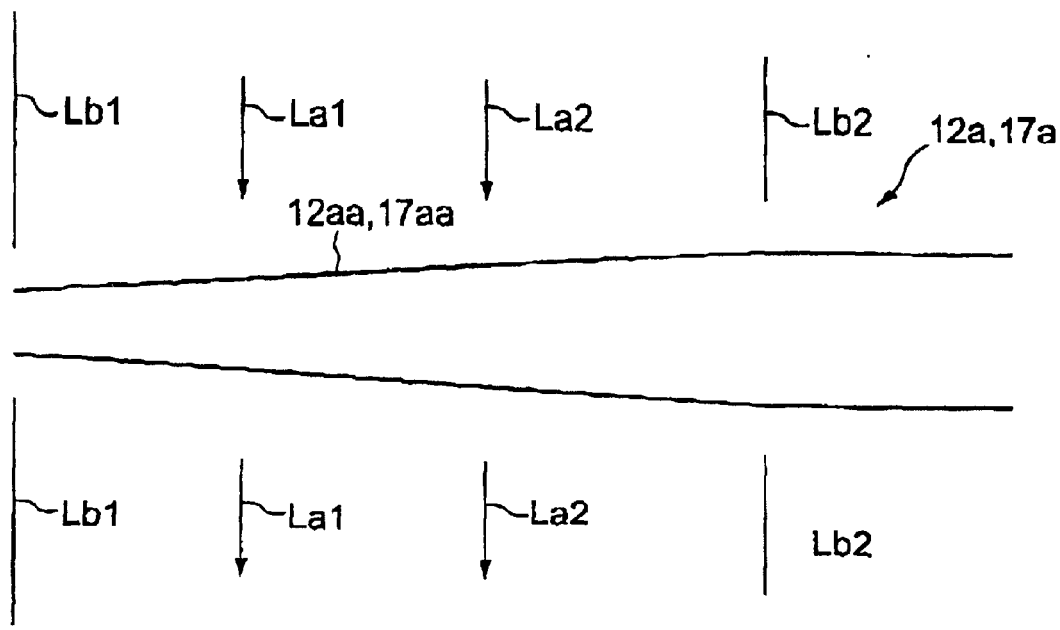
FIGS. 11A and 11B are magnified views of surrounding areas of the core of the input waveguide and the output waveguide of the planar lightwave circuit of a fourth example of a first embodiment of the present invention.
Figure 11B:
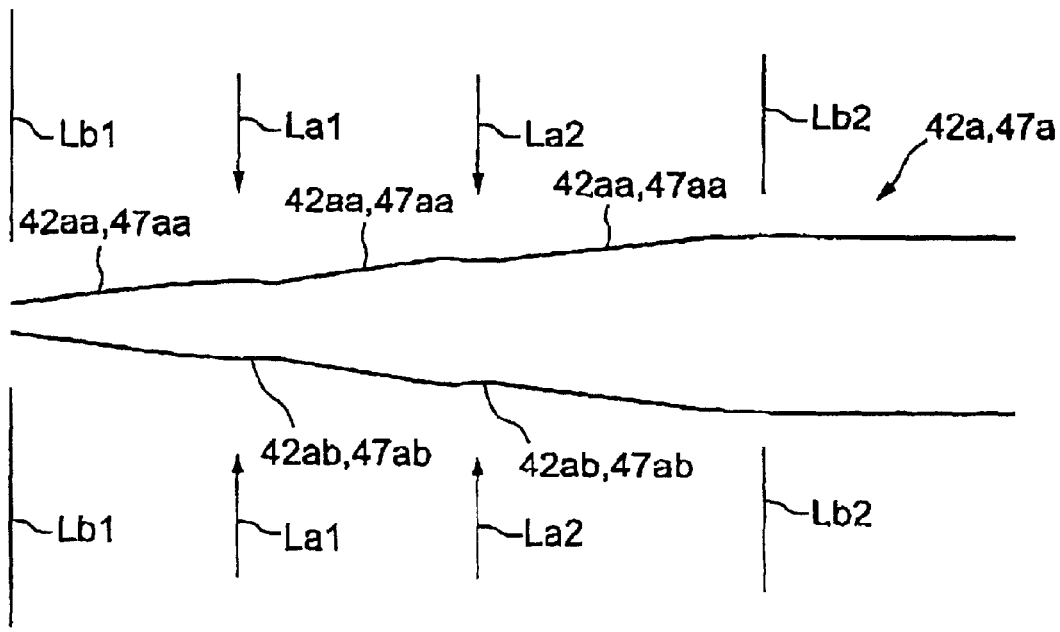

For example, as shown in FIGS. 11A and 11B, markers La1, La2 which indicate dicing positions may be formed near the input or output end of the waveguide of the planar lightwave circuit 10 when fabricating the planar lightwave circuit 10. In addition, markers Lb1, Lb2 which indicate changing positions of core width may be provided. By providing these markers, the accuracy of dicing can be easily improved.

[Second embodiment]

FIRST EXAMPLE

Figure 12:
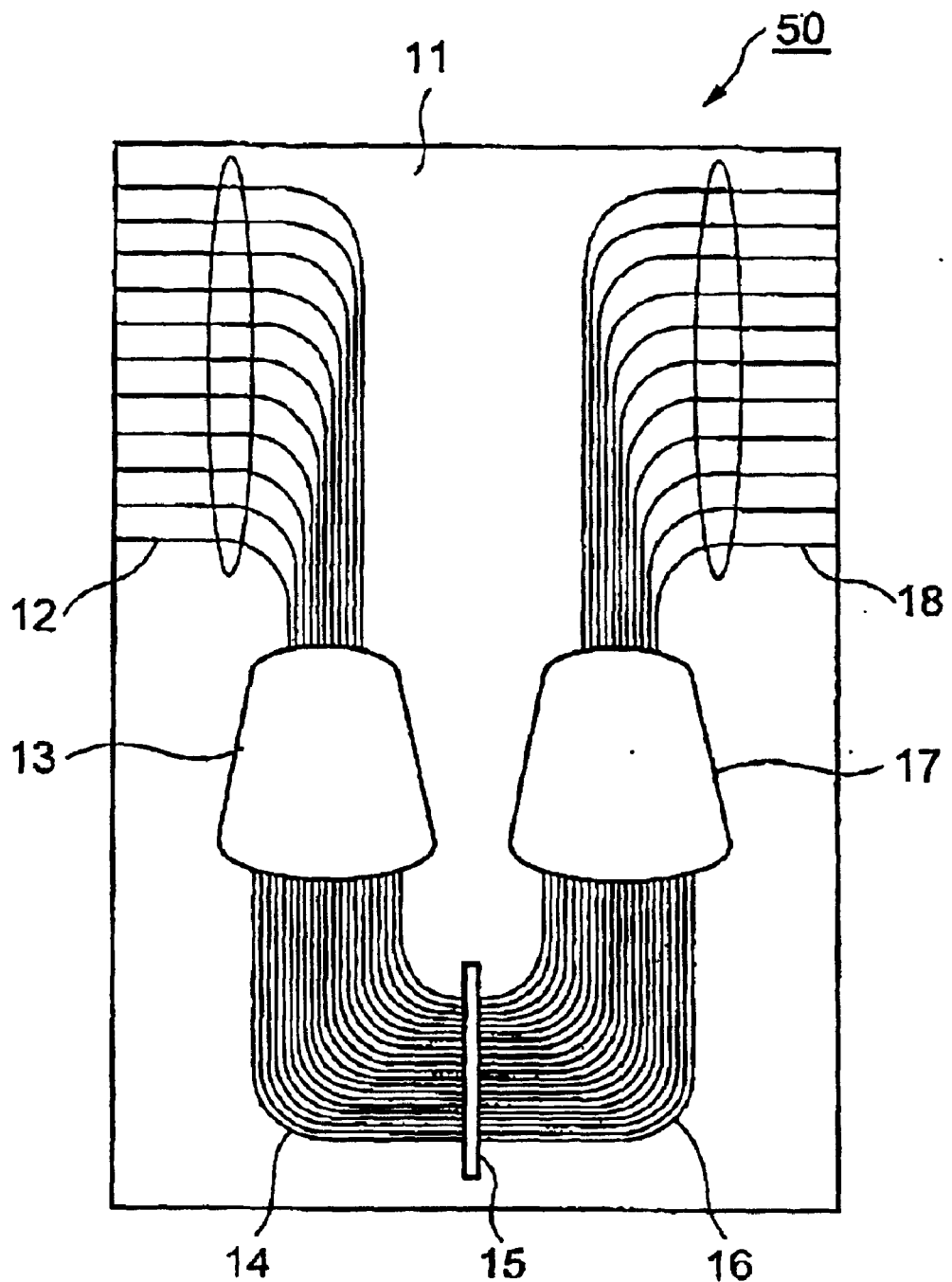
FIG. 12 shows a schematic block diagram of the planar lightwave circuit of a first example of a second embodiment of the present invention.
Figure 13:
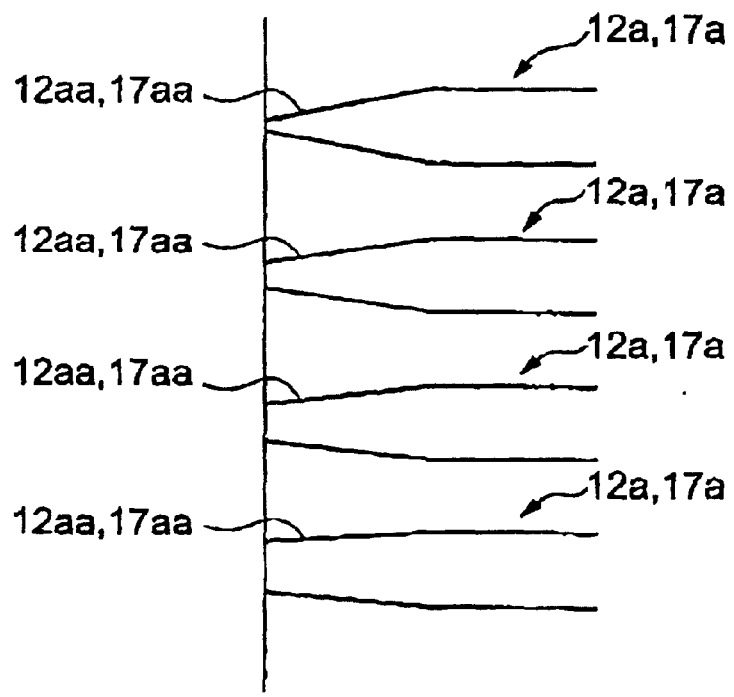
FIG. 13 shows a magnified view of the core of the input waveguides or the output waveguides of the planar lightwave circuit shown in FIG. 12.

A first example of the second embodiment will be described with reference to FIGS. 12 and 13. FIG. 12 shows a schematic block diagram of the planar lightwave circuit, FIG. 13 shows a magnified view of the core of the input waveguides or the output waveguides. Parts which are the same as those of the first embodiment are not described, and the same symbols as those used in the first embodiment are used.

In this embodiment, the present invention is applied to an arrayed waveguide grating (AWG), which is one of planar lightwave circuits, which performs multiplexing of optical signals of a plurality of different wavelengths and demultiplexing in an wavelength division multiplexing communication system. AWG is an example of a waveguide type optical circuit.

As shown in FIG. 12, a plurality of input waveguides 12 are provided on the substrate 11. The core width of input end face of the taper part 12aa of the core 12a is different by each input waveguide as shown in FIG. 13.

In addition, a plurality of output waveguides 17 are provided on the substrate 11. The core width of input end face of the taper part 17aa of the core 17a is different by each output waveguide as shown in FIG. 13.

Figure 14:
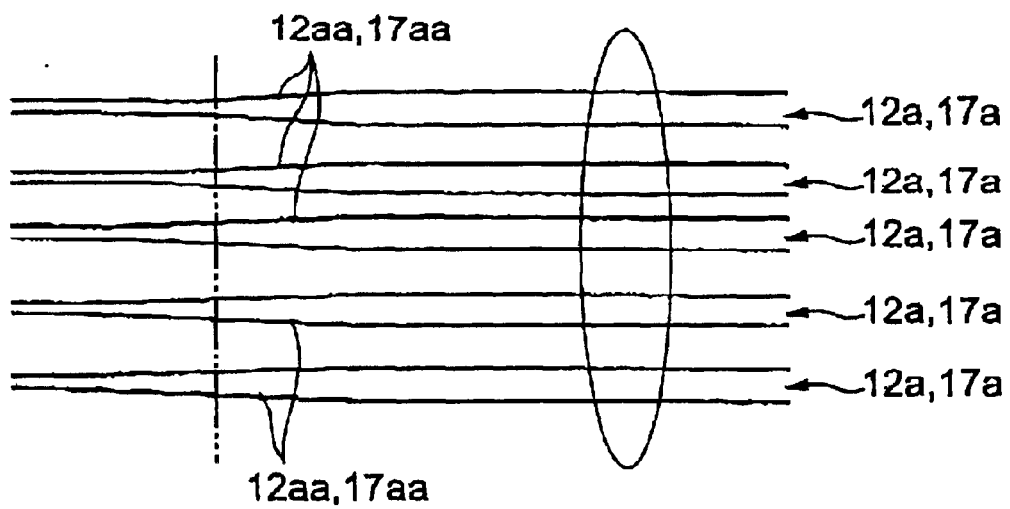
FIG. 14 is a figure for explaining a fabricating method of the core shown in FIG. 13.
Figure 15:
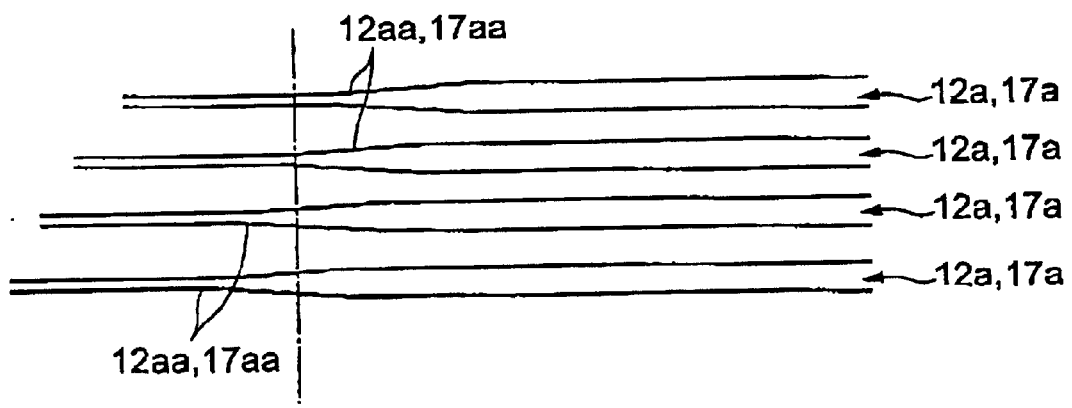
FIG. 15 is a figure for explaining another fabricating method of the core shown in FIG. 13.

The waveguide 12, 17 of the AWG 50 can be fabricated in the same way as the planar lightwave circuit 10 in the first embodiment basically. For example, as shown in FIG. 14, etching masks of taper shape are formed, wherein the width of each etching mask becomes smaller toward the end of the substrate, and the taper angle $\theta$ of the etching masks is different from each other. Or, as shown in FIG. 15, etching masks which have the same taper angle may be provided in which the position of the spotsize converters are shifted in the horizontal direction. Then, reactive ion etching is performed and the substrate is cut straightly. Accordingly, the cores 12a, 17a which include taper parts 12aa, 17aa in which the core width is different from each other can be easily formed.

In the AWG 50 which has such structure, when an optical signal in which lights of a plurality of different wavelengths are multiplexed is entered in any one of input waveguides 12, the optical signal is entered in the arrayed waveguides 14 via the slab waveguide 13, and polarization dependence is dissolved by the half waveplate 15. In addition, the optical signal is demultiplexed into optical signals of the wavelengths in the slab waveguide 16 due to delay line of the arrayed waveguides 14. Then, the optical signals are output from the output waveguides 17.

According to the AWG 50, since the core width of the taper part 12a, 17a at the end face of input or output is different for each other of the waveguides, increase of the coupling loss due to fabrication error can be resolved. The reason will be described in the following.

The multiplexed optical signal entered from an input port (which is not shown in the figure) which is connected to the input waveguide 12 is demultiplexed into signals having different wavelengths and the demultiplexed signals are output from output ports (which is not shown in the figure) connected to the output waveguides 17. The coupling loss varies from output port to output port since the core width varies from output port to output port due to dicing error.

Thus, a plurality of input waveguides 12 in which the core width is different from each other are provided and an input port is connected to each input waveguides 12. As a result, an input port to decrease the coupling loss can be selected for each output port. In addition, since the sum of the coupling losses of an input port and an output port can be selected to be constant, value of the coupling loss can be rendered equal for each port.

SECOND EXAMPLE

It is also possible to apply the core 32a, 37a of the second example of the first embodiment to this embodiment, in which a plurality of steps 32aa, 37aa are formed such that the core width decreases gradually toward the end side of input or output.

THIRD EXAMPLE

In addition, it is also possible to apply the core 42a, 47a of the third example of the first embodiment to this embodiment, in which alternating taper parts 42aa, 47aa and straight parts 42ab, 47ab are provided at the input end side or the output end side located in the end face side of the substrate 11, wherein the core width becomes smaller toward the input or output end as for the taper part, and the core width is fixed at a constant width as for the straight part which is formed along the axis of the core.

FOURTH EXAMPLE

In the first example of this embodiment, an input port is selected among input ports connected to the input waveguides 12 such that the coupling loss becomes smallest. In addition, when it is necessary to use every input waveguide 12, a configuration shown in FIG. 16 can be adopted. The optical circuit shown in FIG. 16 includes AWG 50, input ports i and output ports j. The input port i includes a plurality of input waveguides which were described in the first embodiment and each input port is connected to an input waveguide 12 of AWG 50. The output port j includes a plurality of the output waveguides which were described in the first embodiment and each output waveguide is connected to an output waveguide 17 of the AWG 50. In each input port i, an input waveguide is selected so that signal light is input to an input waveguide 12 of AWG 50, and the signal light is output from output waveguides of the output port j connected to an output waveguide 17 of the AWG 50. Therefore, the coupling loss can be decreased in every port i, j regardless of fabrication error.

[Third Embodiment]

Figure 17:
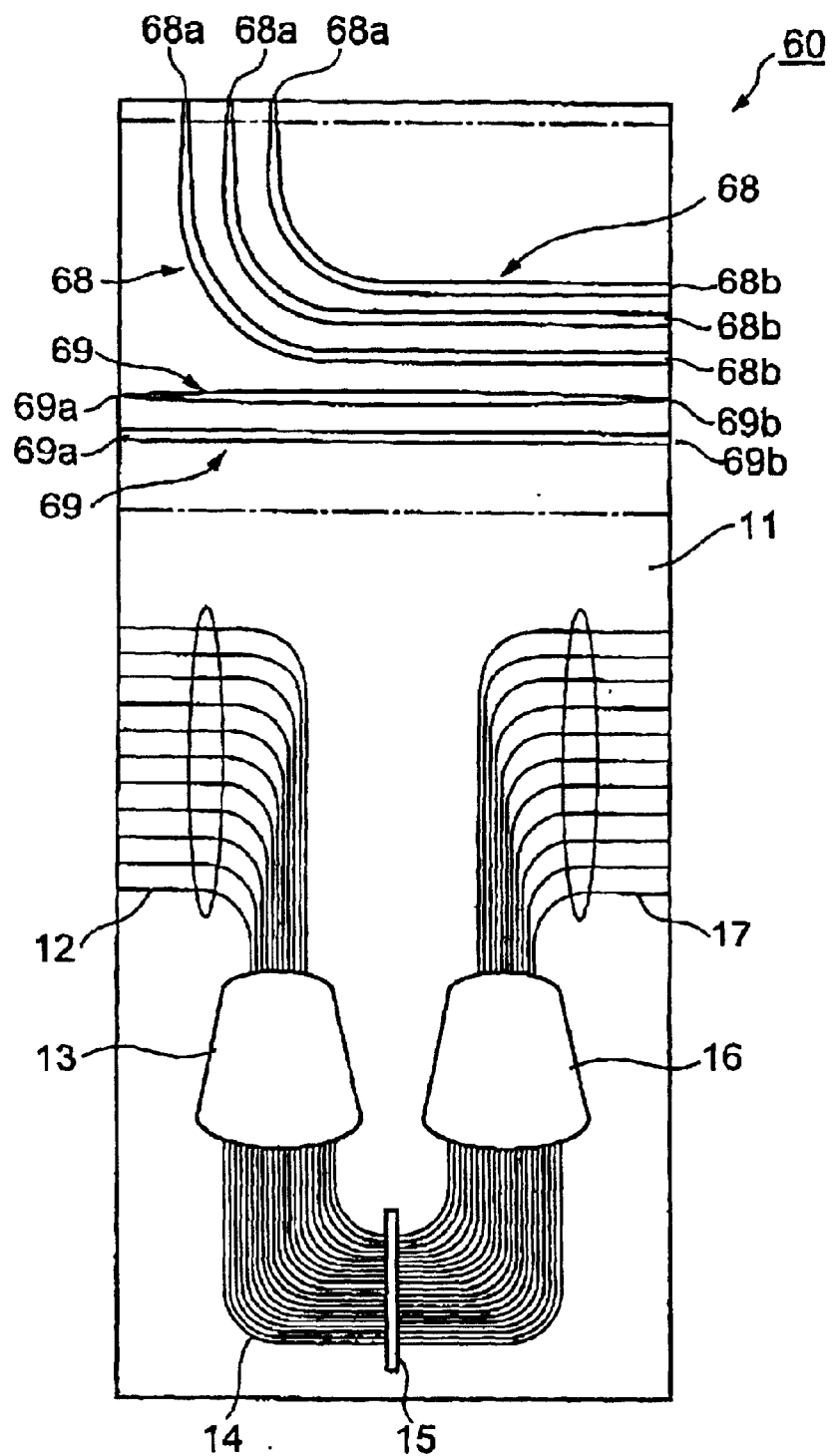
FIG. 17 shows a schematic block diagram of the planar lightwave circuit of a third embodiment of the present invention.

The third embodiment of the planar lightwave circuit of the present invention will be described with reference to FIG. 17. FIG. 17 is a schematic block diagram of the planar lightwave circuit, Parts which are the same as those of the first and second embodiments will not be described, and the same symbols as those used in the first and second embodiments will be used.

As shown in FIG. 17, first monitor waveguides 68 and second monitor waveguides 69 are provided on the substrate 11. As for the first monitor waveguides 68, input ends 68a are located in an end face side of the substrate 11 other than end face sides where the input ends and output ends of the input waveguides 12 and output waveguides 17 are located. In addition, the input end side of the first monitor waveguide is formed as taper such that the core width is decreased toward the input end. The core widths of the input ends 68a are different from each other. Further, the output ends 68b are located in the end face side of the substrate 11 where the output ends of the output waveguides 17 are located.

As for the second monitor waveguides 69, structures of the input ends 69a and the output ends 69b are the same as those of the input waveguides 12 and the output waveguides 17 respectively. That is, the input ends 69a are located in an end face side of the substrate 11 where the input ends of the input waveguides 12 are located. In addition, each of the input end sides 69a are formed as taper such that the core width becomes smaller toward the input end, and, the core widths of the input ends 69a are different from each other. The output ends 69b are located in an end face side of the substrate 11 where the output ends of the output waveguides 17 are located. In addition, each of the output end sides 69b are formed as taper such that the core width becomes smaller toward the output end, and, the core widths of the output ends 69b are different from each other.

According to the AWG 60 on which the monitor waveguides 68 and 69 are formed, the core widths of the input end face of the input waveguides 12 and the core widths of the output end face of the output waveguides 17 can be set as proper sizes in the following way.

The input ends 68a of the monitor waveguides 68 on the substrate 11 are cut and the coupling loss of each monitor waveguide 68 is measured repeatedly so that the dependence of the coupling loss on the core width is checked. As a result, an optimum core width is obtained. After that, the end sides of the input waveguides 12 and the output waveguides 17 are cut such that the optimum core width is realized.

In addition, by measuring the coupling losses of the monitor waveguides 69, dicing error of the input waveguides 12 and the output waveguides 17 can be checked.

According to the AWG 60 of this embodiment, dicing error which occurs for each individual substrate 11 can be monitored, and optimum core width can be formed for the individual substrate 11.

Although examples in which the spotsize converter is applied to the AWG have been described in the above-mentioned second and third embodiments, it is not limited to the AWG. The present invention can be applied to any planar lightwave circuit and to any optical circuit by providing input and output waveguides where the core widths are different and selecting an optimum port when using the planar lightwave circuit. As a result, the coupling loss can be decreased irrespective of fabrication error.

[Fourth Embodiment]

Next, the fourth embodiment of the present invention will be described with reference to FIGS. 18–20.

Figure 18:
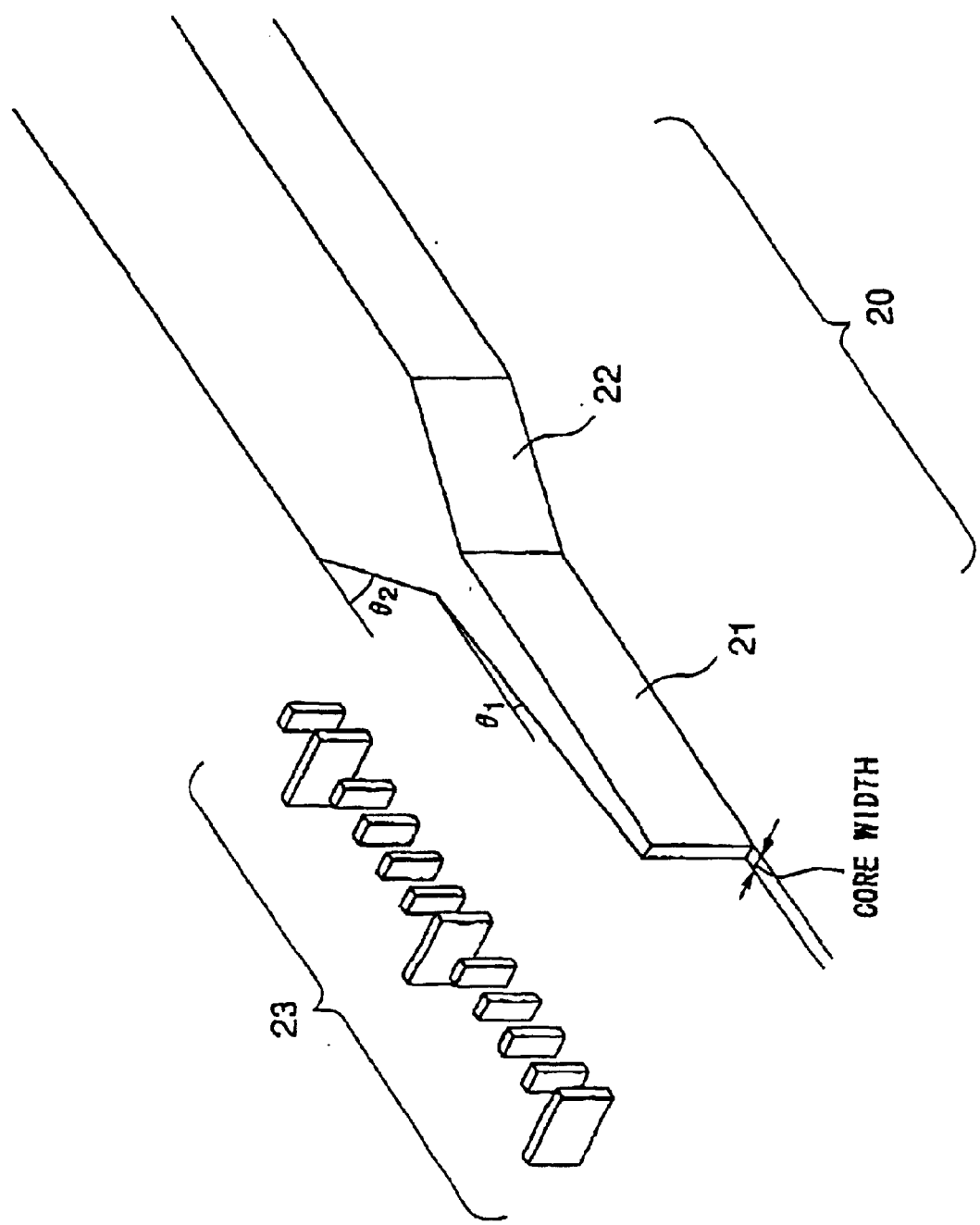
FIG. 18 is a magnified view of the spotsize converter provided in an input or output waveguide of the planar lightwave circuit of a fourth embodiment of the present invention.
Figure 19:
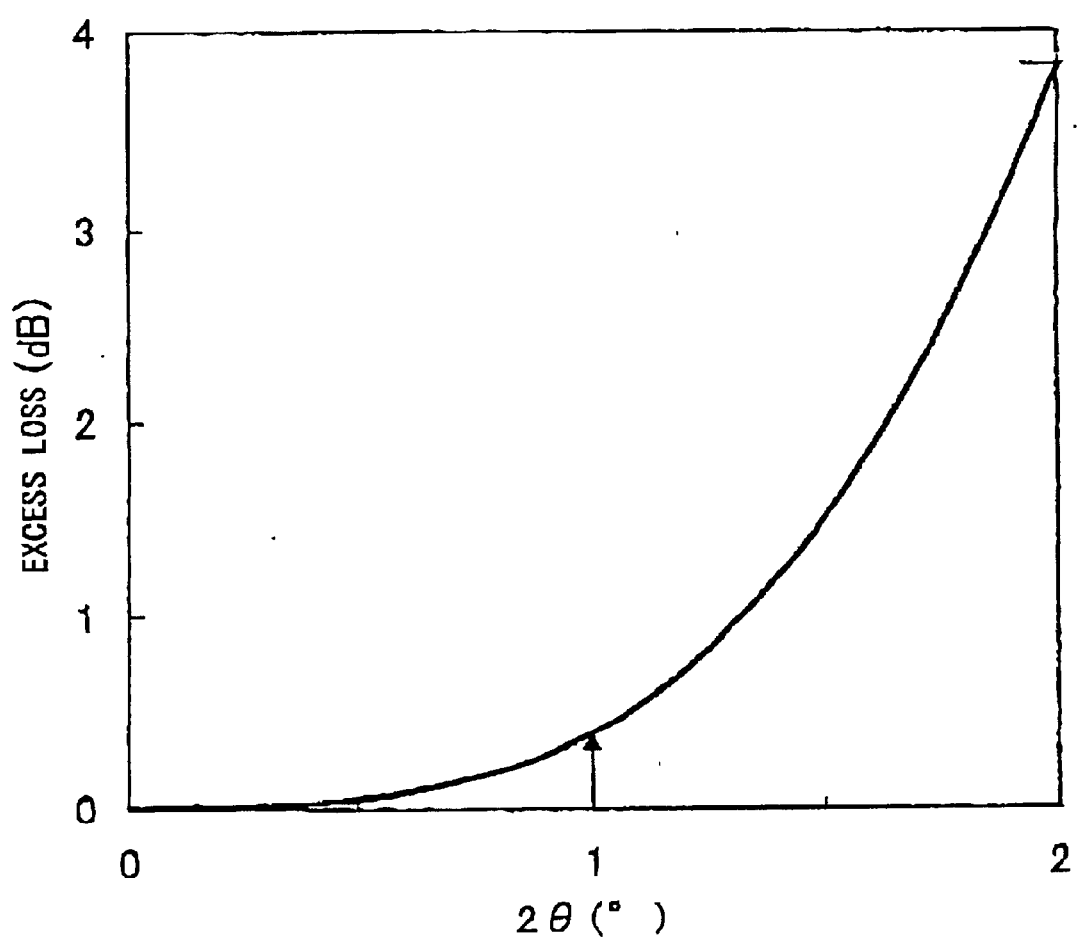
FIG. 19 shows a relationship between a taper angle and the excess loss which is obtained by calculation.

FIG. 18 is a magnified view of the spotsize converter provided in an input or output waveguide of an planar lightwave circuit, FIG. 19 shows a relationship between a taper angle and the excess loss. FIG. 20 shows an example of application of the spotsize converter according to this embodiment. Parts which are the same as those of the above-mentioned embodiments will not be described, and the same symbols as those used in the embodiments will be used.

In this embodiment, a spotsize converter 21 shown in FIG. 18 is provided in the input/output waveguide in the planar lightwave circuit shown in FIG. 4. Since the spotsize converters which are provided in the input waveguide and the output waveguide are the same, symbols are not provided in order to differentiate between the input waveguide and the output waveguide in the following figures.

As shown in FIG. 18, the spotsize converter 20 of the present invention includes a core width fine-tuning part 21 and a core width converting part 22 which follows the core width fine-tuning part 21. The difference between the parts 21 and 22 is the taper angle. The taper angle is defined as two times of $\theta_1$ or $\theta_2$ in FIG. 18. The taper angle $2\theta_1$ of the core width fine-tuning part is set to be smaller than the taper angle $2\theta_2$ of the core width converting part 22. In addition, markers 23 which indicate dicing positions of a waveguide may be provided. Details of the markers will be described later.

In the following, design parameters of the core width fine-tuning part 21 and the core width converting part 22 will be described in detail.

As mentioned so far, according to the present invention, the input/output waveguide is formed as a taper shape such that optimum core width can be obtained with reliability by adjusting end face position. However, since the end face position of the waveguide is realized with accuracy of only about ±100 μm, the taper angle $2\theta_1$ is set to be 0.057° in order to obtain ±0.1 μm accuracy of the core width in this embodiment.

Generally, the waveguide and the optical fiber is connected and fixed by an adhesive. Since the refractive index of the adhesive is subtly different from that of the glass, light reflections occur on a connection surface. To prevent the reflected light from reentering the optical fiber or the optical waveguide, the end surfaces of an optical waveguide and an optical fiber are generally angle polished by 5°–10°. In the current state that the input/output end face position is obtained by the angle polishing, it is difficult to obtain the input/output end face position with high accuracy. The accuracy of the end face position obtained by experiment was ±100 μm.

Therefore, the taper angle for fine-tuning part should be as small as possible to provide a higher degree of tolerance for angle polishing. Thus, as mentioned above, according to this embodiment, the taper angle $2\theta_1$ is set to be 0.057° in order to obtain ±0.1 μm accuracy for finally obtained core width.

In this case, taper length of 4.2 mm is required when a simple taper is adopted where the core width is narrowed from 5 μm to 0.8 μm. Such a long taper is not desirable considering that the object of adopting the superhigh-waveguide is to downsize the planar lightwave circuit. ⊿Therefore, according to the present invention, the spotsize converter 21 is divided into two sections which are the core width converting part 22 in which the core width is decreased sharply to the extent that loss does not occur and the core width fine-tuning part 21 in which the taper angle is set to be small in consideration of error of the end face forming position.

It is desirable that the taper angle $2\theta_2$ of the core width converting part is large to the extent that the excess loss does not occur. As shown in the relationship of the taper angle and the excess loss in FIG. 19, it is evident that the smaller the taper angle is, the lower the excess loss is. In this embodiment, $2\theta_2$ is set to be 1° so that the core width in the core width converting part is decreased from 5 μm to 1.5 μm. In this case, the length of the core width converting part becomes about 200 μm.

As for the core width fine-tuning part, as mentioned above, the taper angle $2\theta_1$ is set to be 0.057° so that the core width decreases from 1.5 μm to 0.8 μm in order that accuracy for forming the optimum core width becomes ±0.1 μm. In this case, the length of the core width fine-tuning part is 700 μm.

As a result, the sum of the lengths of the core width fine-tuning part and the core width converting part becomes 900 μm, which is about one-fifth of 4.2 mm of the case when using the simple taper.

It is desirable that the taper angle $2\theta_2$ of the core width converting part is larger than 0.08° and equal to or smaller than 10°. Because, when the taper angle $2\theta_2$ is equal to or smaller than 0.08°, the length of the core width converting part becomes too long so that downsizing can not be realized. When the taper angle $2\theta_2$ is larger than 10°, the excess loss becomes too large.

In addition, the taper angle of the core width fine-tuning part is larger than 0° and equal to or smaller than 0.08°. Because, when the taper angle $2\theta_1$ is larger than 0.08°, the length of taper part becomes too short so that adequate accuracy is not obtained due to mechanical polishing error.

Figure 20:
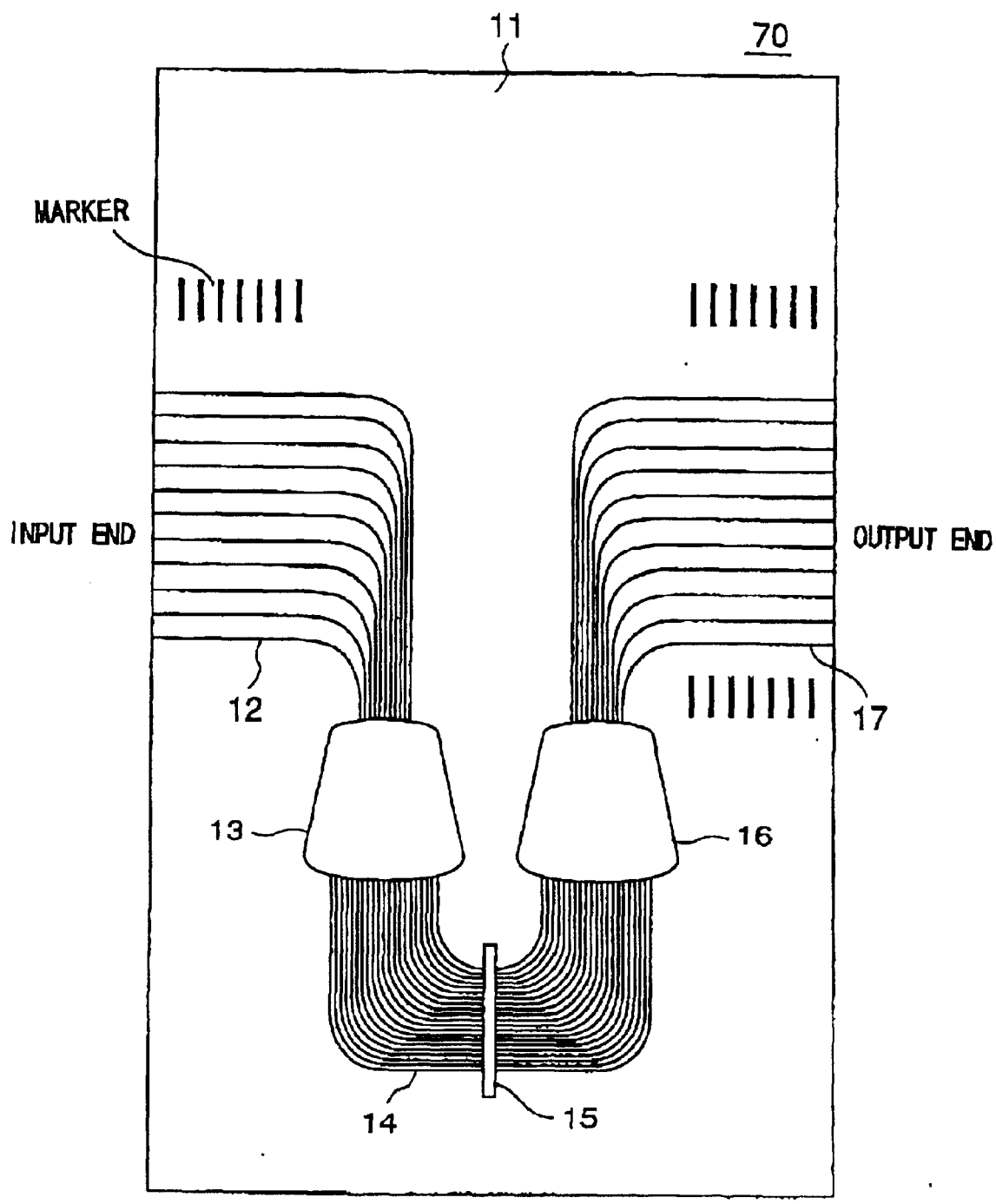
FIG. 20 shows an example of application of the spotsize converter according to the fourth embodiment.

The spotsize converter 20 shown in FIG. 18 can be applied to the AWG which is described in the second embodiment as shown in FIG. 20 in addition to the planar lightwave circuit shown in FIG. 4.

In this case, the spotsize converter of the present invention is provided in the input end side of the AWG 70 in which the core width decreases toward the input end, and the spotsize converter of the present invention is provided in the output end side of the AWG 70 in which the core width decreases toward the output end.

In addition, in the same way as the second embodiment, the AWG can be formed such that the core widths of the end faces are different for each spotsize converter. In order to form the AWG like this, the spotsize converters in the input end and the output end are formed such that the taper angles $\theta_1$ are different from each other, or, the positions of the spotsize converters are shifted to each other. Then, the substrate is cut straightly for obtaining a proper core width.

In addition, dicing positions of the end faces can be determined by using the markers shown in FIG. 18 and FIG. 20. As shown in FIG. 20, the markers may be provided only in the upper side of the spotsize converter or may be provided in the both sides of the spotsize converter.

The above-mentioned waveguide can be fabricated in the same way as described in the above-mentioned embodiments. The waveguides can be made of polyimide, silicon, semiconductor, $LiNbO_3$ and the like in addition to silica-based glass.

Figure 16:
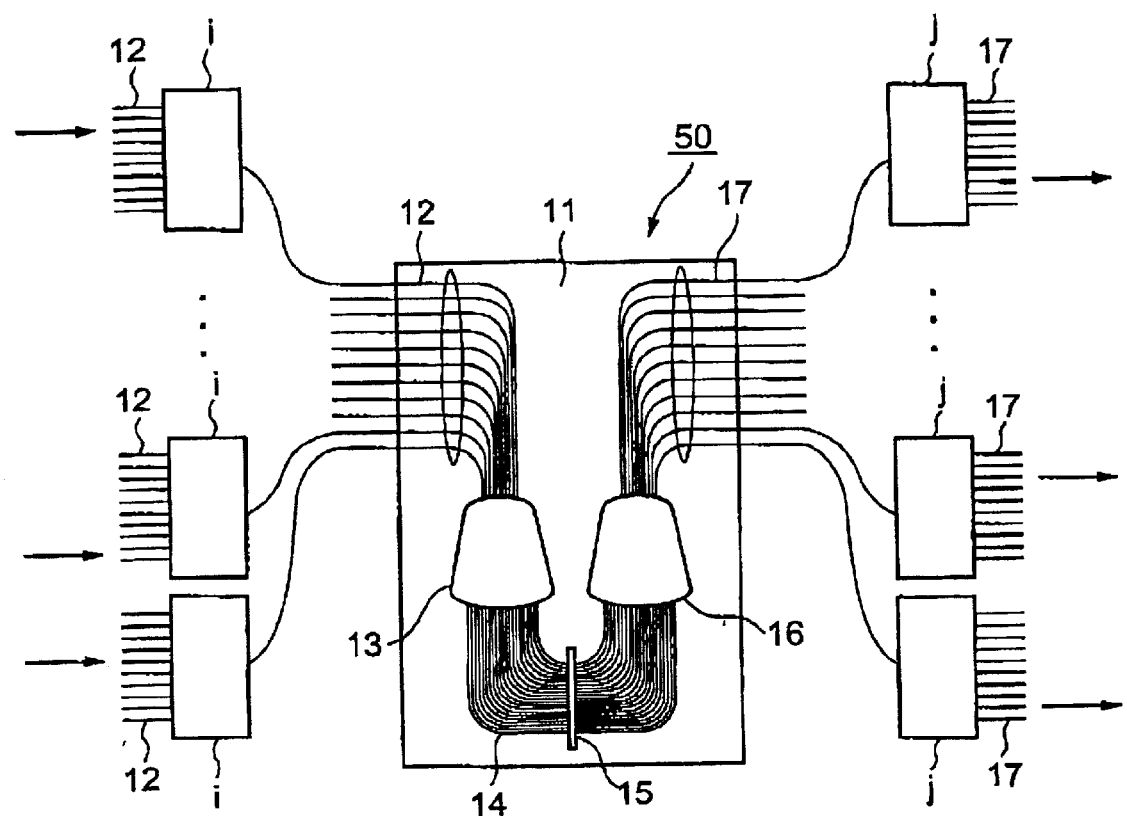
FIG. 16 shows a schematic block diagram of the planar lightwave circuit of a second example of the second embodiment of the present invention.

This embodiment can be also applied to the input/output ports which were described by FIG. 16. In addition, although the arrayed waveguide grating (AWG) has been adopted as an example of the planar lightwave circuit in this embodiment, application of the present invention is not limited to the AWG since the point of the present invention is in the input/output waveguide including the spotsize converter so that the application of the present invention does not depend upon the kind of optical circuits.

[Fifth Embodiment]

Figure 21:
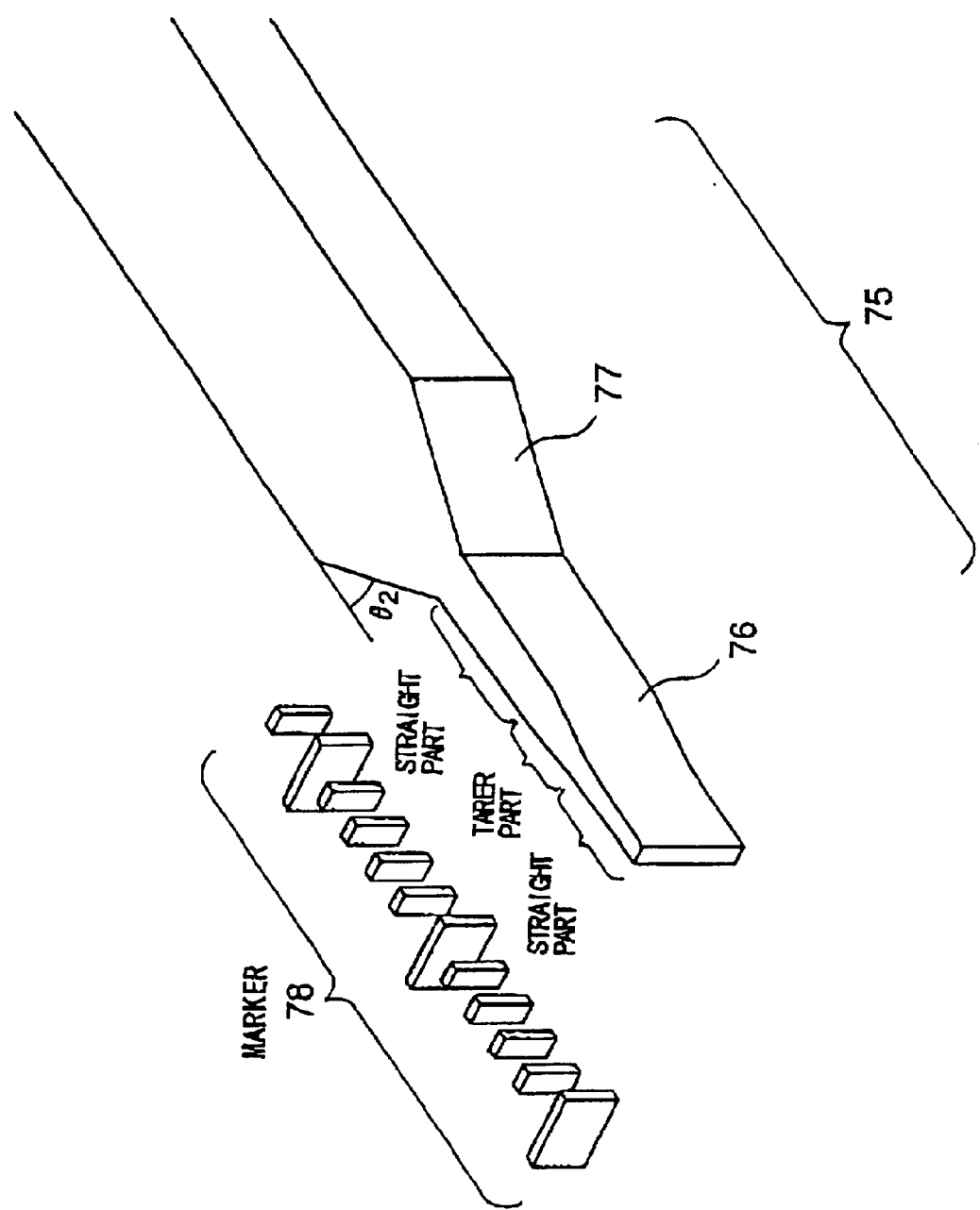
FIG. 21 is a magnified view of the spotsize converter provided in an input or output waveguide of the planar lightwave circuit of a fifth embodiment of the present invention.
Figure 22:
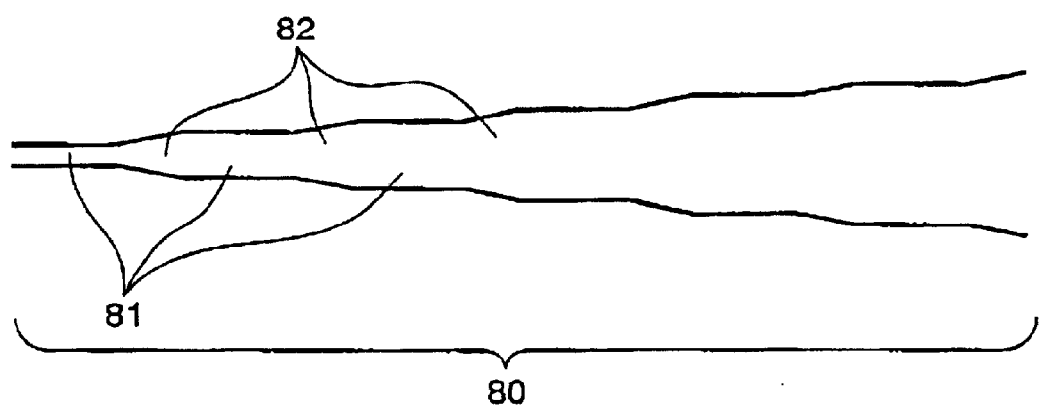
FIG. 22 shows an example of a core width fine-tuning part of the fifth embodiment.
Figure 23:
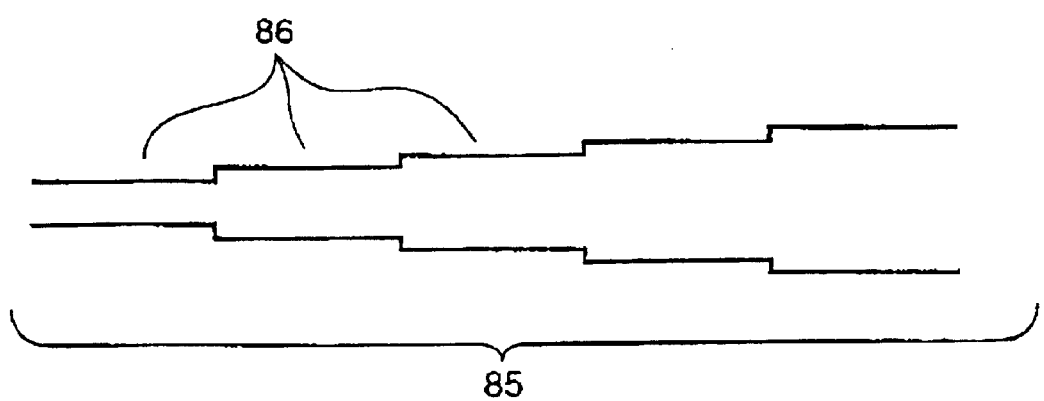
FIG. 23 shows another example of a core width fine-tuning part of the fifth embodiment.

A spotsize converter 75 of the fifth embodiment of the present invention is shown in FIG. 21, and magnified views of examples of the core width fine-tuning part 76 of FIG. 21 are shown in FIGS. 22 and 23.

This embodiment is almost the same as the fourth embodiment where a difference is in the core width fine-tuning part 76. As shown in FIG. 18, the core width fine-tuning part is formed by a simple tapered waveguide of the taper angle $2\theta_1$ in the fourth embodiment. On the other hand, in this embodiment, as shown in FIG. 21, the core width fine-tuning part is configured by taper and straight parts or a plurality of tapers in which taper angles may be different, instead of configured by the simple taper.

For example, the core width fine-tuning part may be formed by alternately connecting tapered waveguides 82 and straight waveguides 81. In addition, the core width fine-tuning part may be formed by steps of straight waveguides as shown in FIG. 23. In this example, since the end face of the waveguide is in the straight waveguide instead of the tapered waveguide, the coupling loss between the waveguide and an optical fiber decreases.

Figure 24:
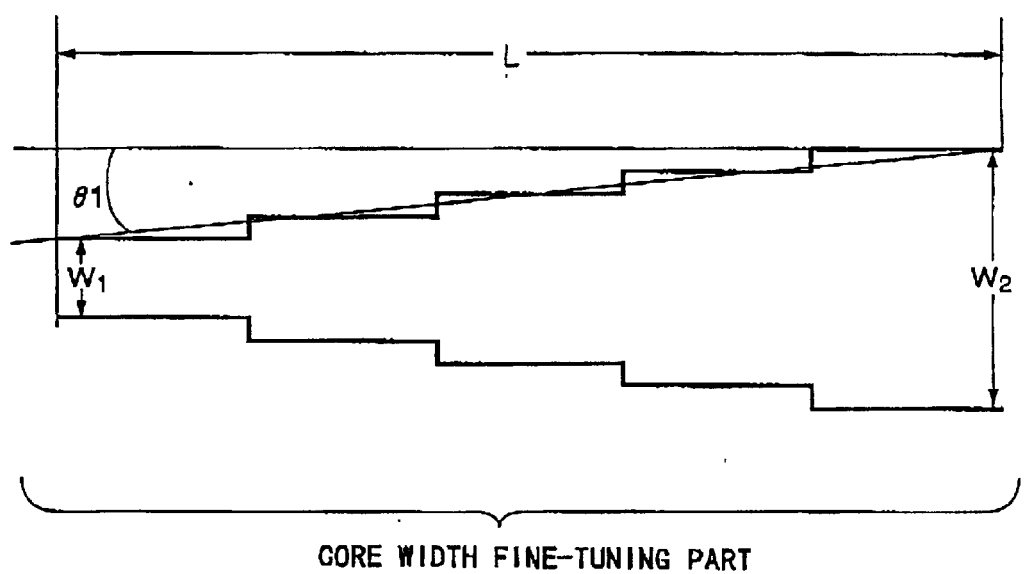
FIG. 24 is a figure for explaining a definition of a mean taper angle.

A mean value (which will be called a mean taper angle) of the taper angle $2\theta_1$ is defined by the following equation wherein the core width at an end which connects to the optical fiber is W1 and the core width at an end which connects to the core width converting part is W2, the length of the core width fine-tuning part is L as shown in FIG. 24.

$$2\theta_1 = 2 \cdot \tan^{-1}\left(\frac{W2 - W1}{2 \cdot L}\right) \quad (3)$$

For example, when the core width fine-tuning part is configured such that the mean taper angle $2\theta_1$ is 0.057° and the straight waveguide is repeated seven times where the length of a straight waveguide is 200 μm, the core width can be decreased from 1.5 μm to 0.8 μm. $\theta_1$ instead of $2\theta_1$ may be also called a mean taper angle. In addition, $\theta_2$ instead of $2\theta_2$ may be also called a mean taper angle, The above definition of the mean taper angle also can be used for the core width converting part. In this case, W2 in FIG. 24 is used as the above-mentioned W1 in the equation (3), a core width of the waveguide other than the spotsize converter is used as the above-mentioned W2 in the equation (3) and the length of the core width converting part is used as the above-mentioned L in the equation (3).

In addition, the definition of the above-mentioned mean taper angle can be used for the spotsize converter of the first embodiment which does not have the core width converting part. In this case, a core width of the waveguide other than the spotsize converter part can be used as W2 in the equation (3) and the length of the spotsize converter can be used as L in the equation (3).

Also in this embodiment, the configurations shown in FIG. 16 and FIG. 20 can be realized. In addition, the present embodiment can be applied to various optical circuits in the same way as the fourth embodiment.

[Sixth Embodiment]

Next, a planar lightwave circuit will be described which allows to realize optimum core width even when several conditions vary depending on process conditions with reference to FIGS. 25–28. In each figure, parts which are the same as those of the above-mentioned embodiments will not be described, and the same symbols as those used in the embodiments will be used.

In this embodiment, in the same way as the third embodiment, monitor waveguides each of which has the spotsize converter of the present invention are provided separately from the planar lightwave circuit on a substrate on which the planar lightwave circuit is formed.

Figure 25:
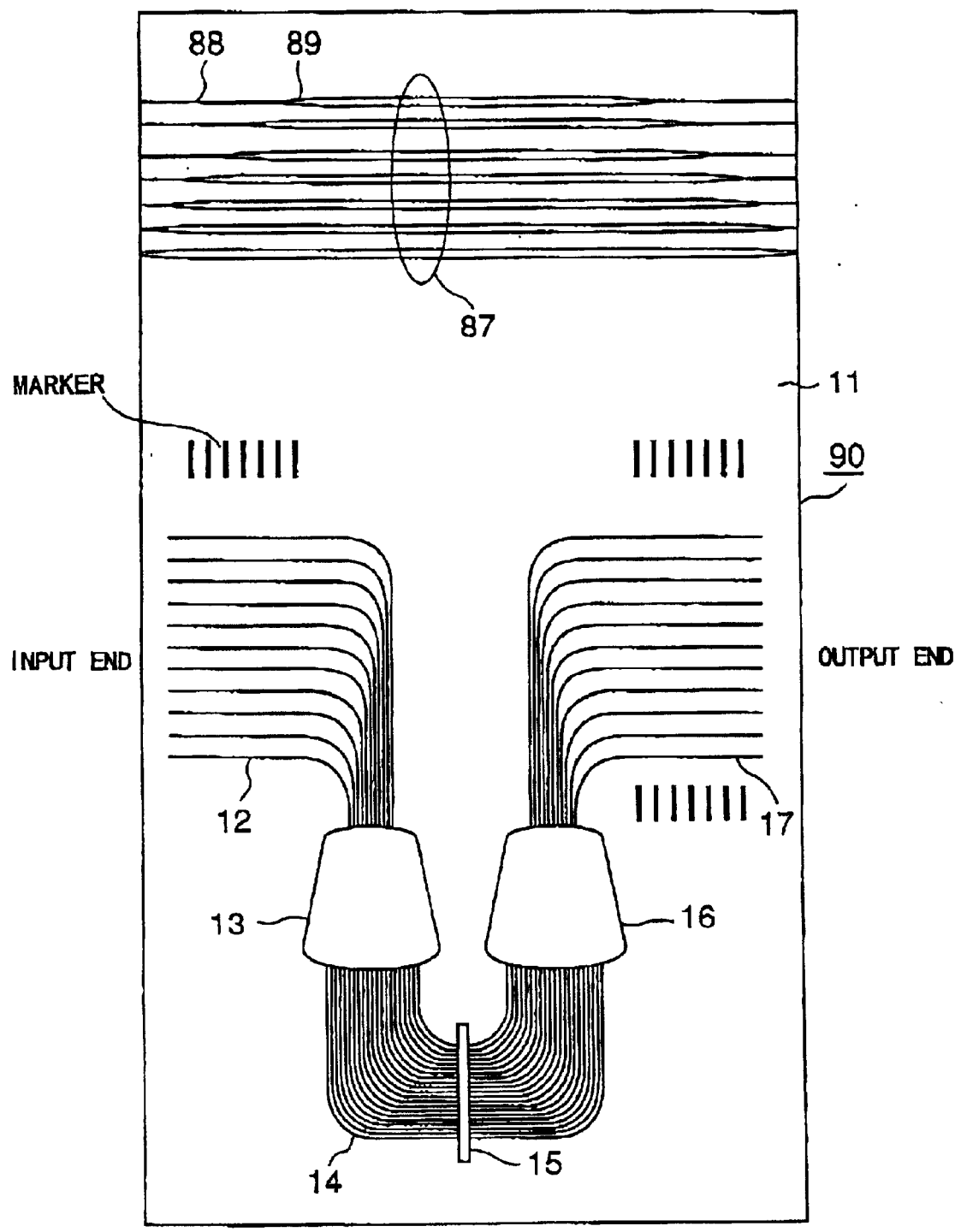
FIG. 25 shows a schematic block diagram of the planar lightwave circuit of a sixth embodiment of the present invention.
Figure 26:
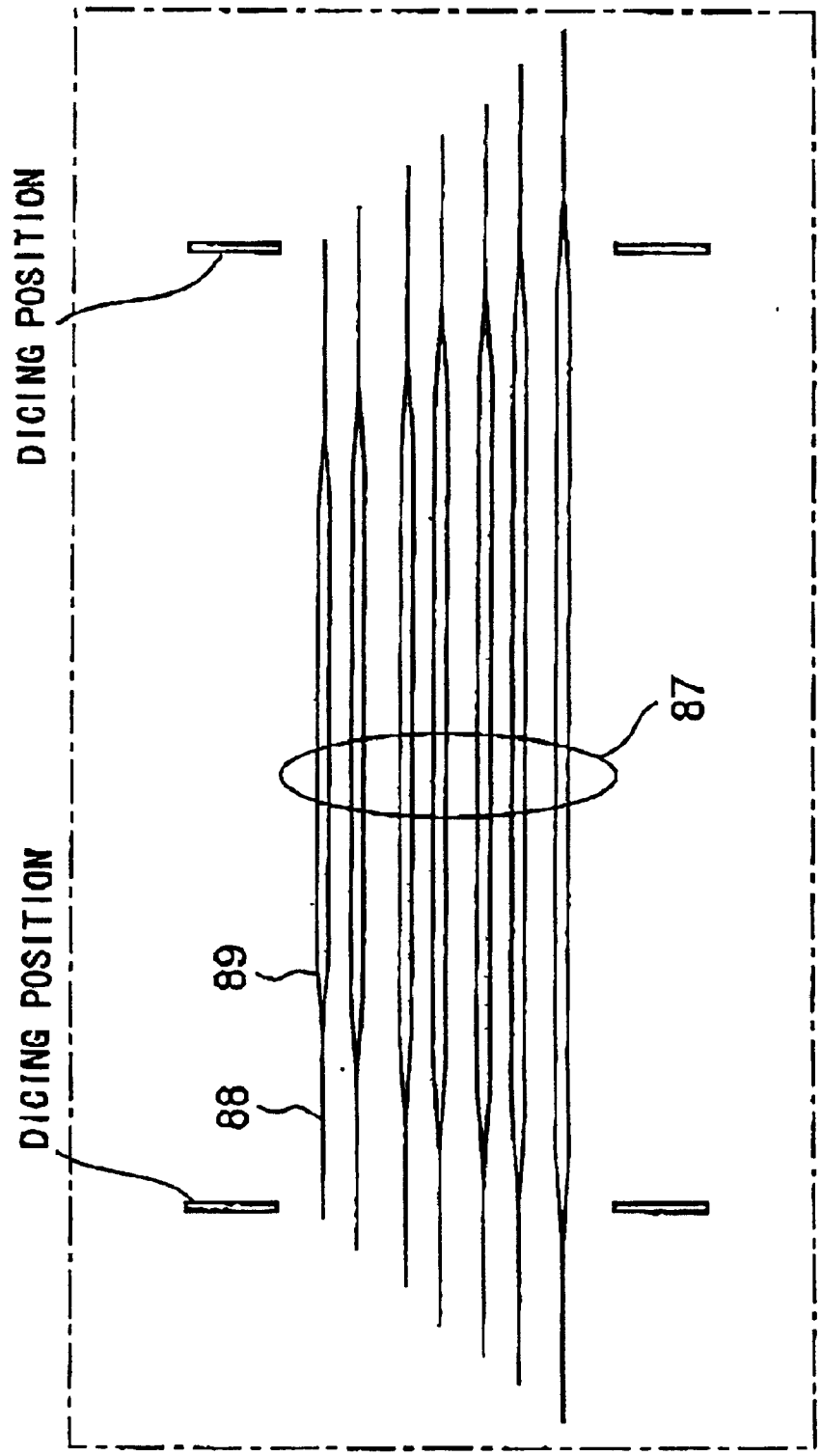
FIG. 26 shows monitor waveguides in the sixth embodiment.
Figure 27:
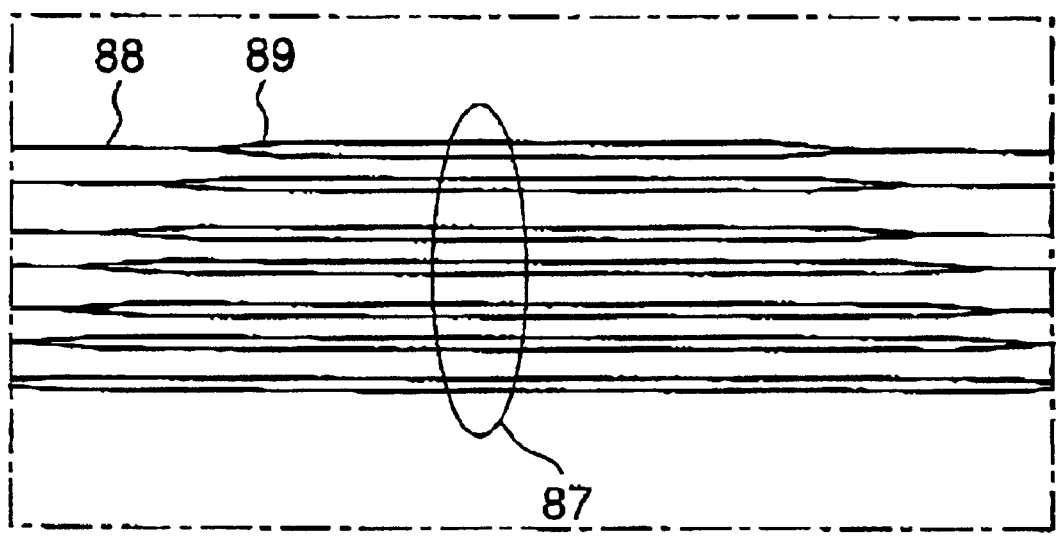
FIG. 27 shows the monitor waveguides after dicing.

FIG. 25 shows an example in which the monitor waveguides and an AWG 90 like one shown in FIG. 20 are provided on a substrate. FIG. 26 shows the part of the monitor waveguides. As shown in FIG. 26, according to the present embodiment, seven monitor waveguides 87 are provided wherein locations of each spotsize converter which includes a core width fine-tuning part 88 and a core width converting part 89 are shifted to each other by 100 μm. By dicing these monitor waveguides collectively at a dicing position, the monitor waveguides have various core widths different from each other at the end face. By evaluating the coupling loss between each monitor waveguide and an optical fiber, a core width for minimizing the coupling loss can be obtained empirically. FIG. 27 shows the monitor waveguides after dicing.

In the configuration shown in FIG. 25, since the spotsize converters are located in the inside of dicing position of the monitor waveguides, the planar lightwave circuits can be cut after the optimum core width is obtained by using the monitor waveguides.

Figure 28:
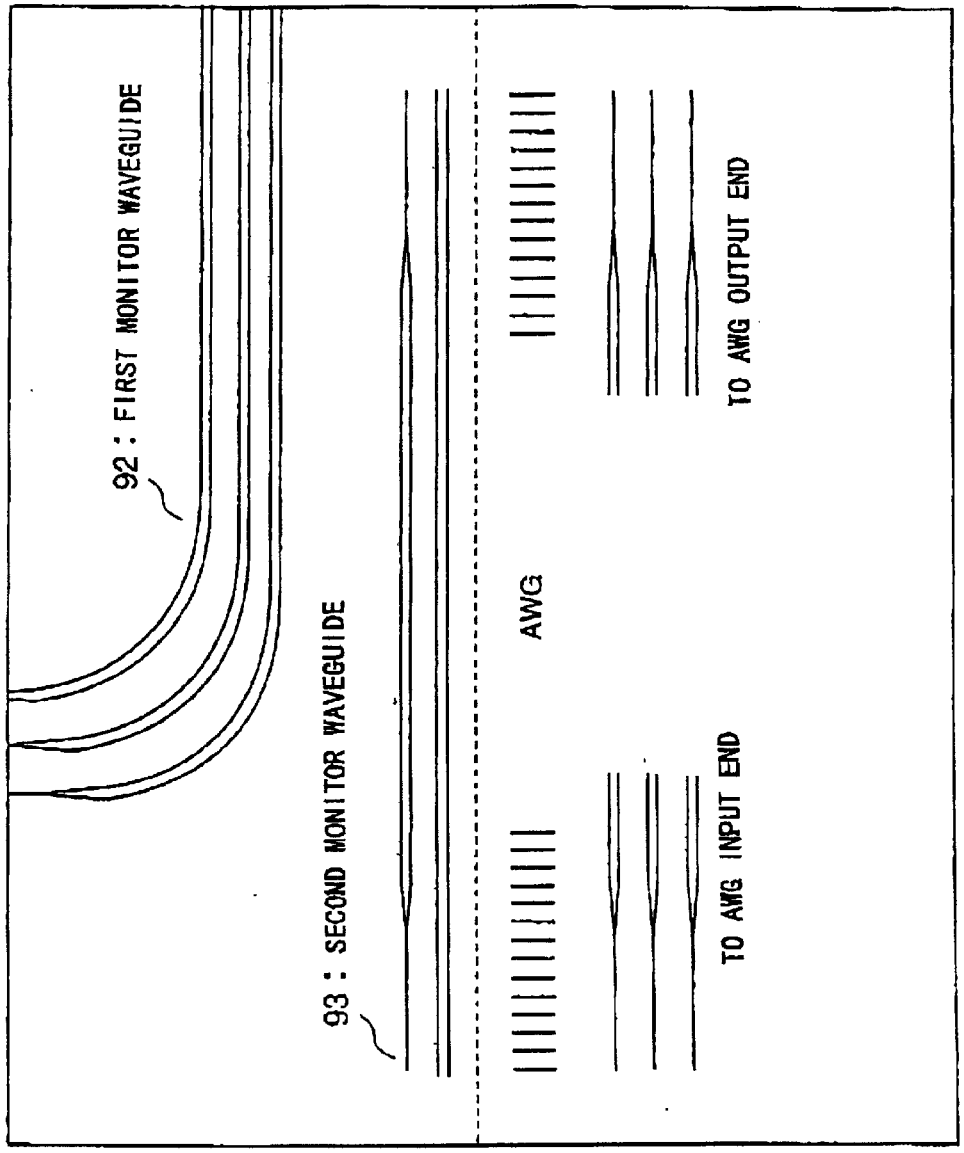
FIG. 28 shows another example of monitor waveguides in the sixth embodiment.

This embodiment also can be configured like the configuration shown in FIG. 17. FIG. 28 shows a magnified view of a part including the monitor waveguides of this case. The right end sides of first monitor waveguides 92 in FIG. 28 are straight. After the optimum core width is obtained by the first monitor waveguides 92, the planar lightwave circuit is cut. In addition, the coupling loss of the AWG can be estimated by using second monitor waveguides 93. As shown in FIG. 28, the second monitor waveguides 93 may include a monitor waveguide having spotsize converters each of which is the same as that used in the input/output end of the AWG and a monitor waveguide which is straight in the both ends In this case, difference of the excess loss between the two monitor waveguides represents the amount of the excess loss decreased by the spotsize converter.

The planar lightwave circuit which has the monitor waveguides and the planar lightwave circuit which is intended to be fabricated may be provided separately.

[Seventh Embodiment]

In the following, various embodiments of the markers which indicate end face forming position will be described.

In order to implement the core width which is obtained by using the monitor waveguides shown in FIGS. 25, 28 to the input/output waveguide of the target planar lightwave circuit, markers shown in FIG. 18 for example are provided such that the end face forming position in the core width fine-tuning part can be perceived when performing mechanical polishing process.

By properly providing the monitor waveguides and the markers, the planar lightwave circuit can be configured, for example, such that when the coupling loss is lowest in the fifth monitor waveguide, the coupling loss can be minimized by processing the end face such that the position of the fifth marker becomes the end face.

The markers can be provided in various forms. For example, markers shown in FIGS. 29–32B can be provided.

Figure 29:
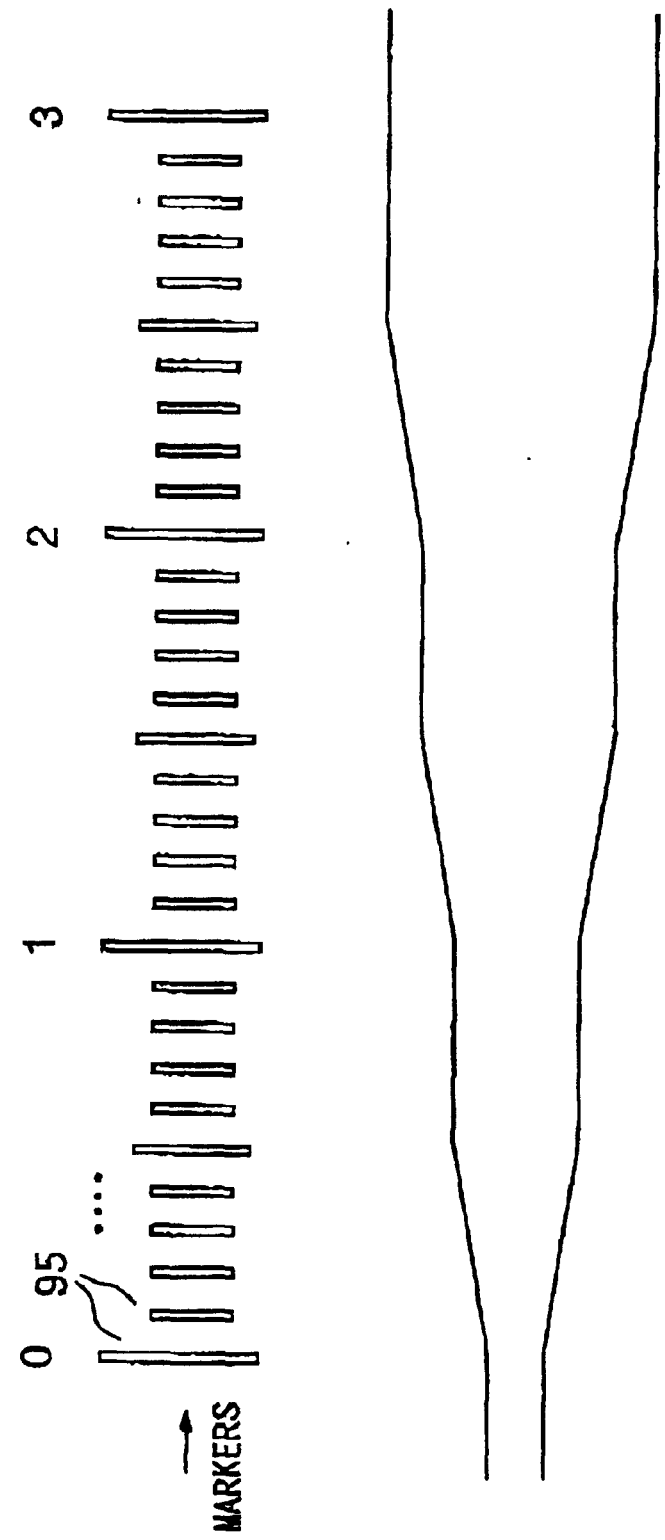
FIG. 29 shows a first example of markers of the planar lightwave circuit of the present invention.

FIG. 29 shows a first example of the markers in which vertical lines 95 are placed at regular intervals like a ruler. As shown in FIG. 29, symbols (numerals) may be provided. The cutting position can be determined by reading the markers.

Figure 30A:
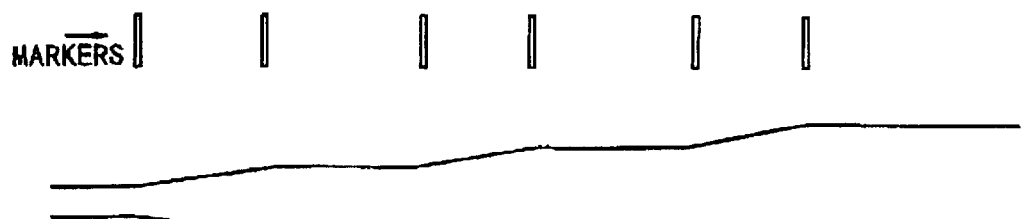
FIGS. 30A–30C show second examples of markers of the planar lightwave circuit of the present invention.
Figure 30B:
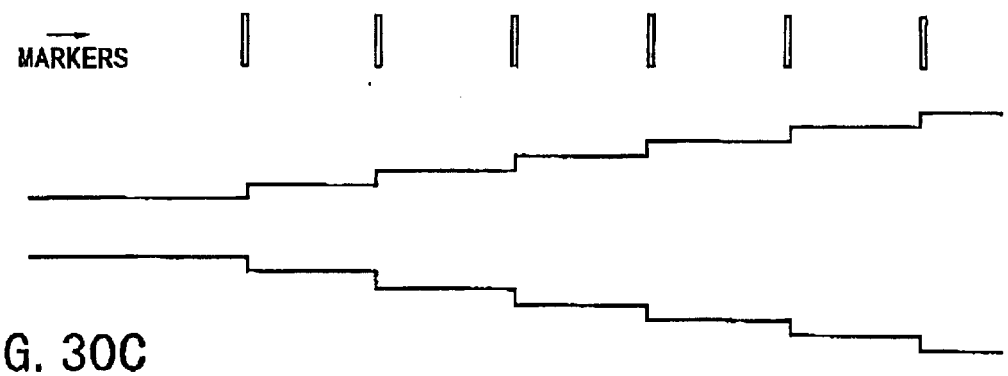
Figure 30C:
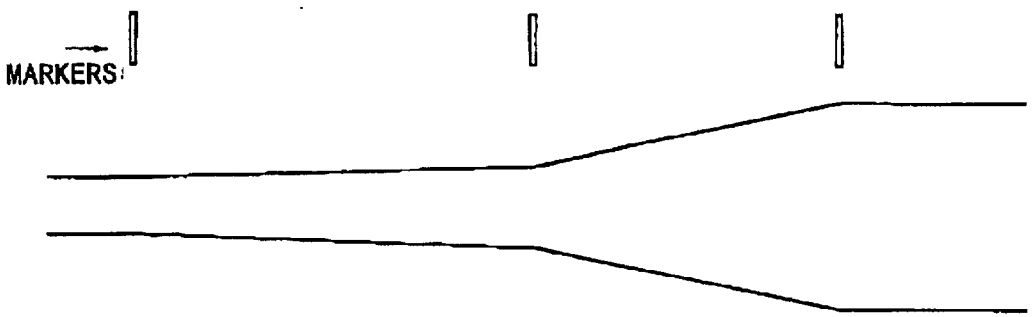

FIGS. 30A–30C show a second example of the markers, which indicate positions where the shape of the spotsize converter changes. In this case, the optimum core width can be obtained by cutting a part between two markers, for example.

Figure 31A:
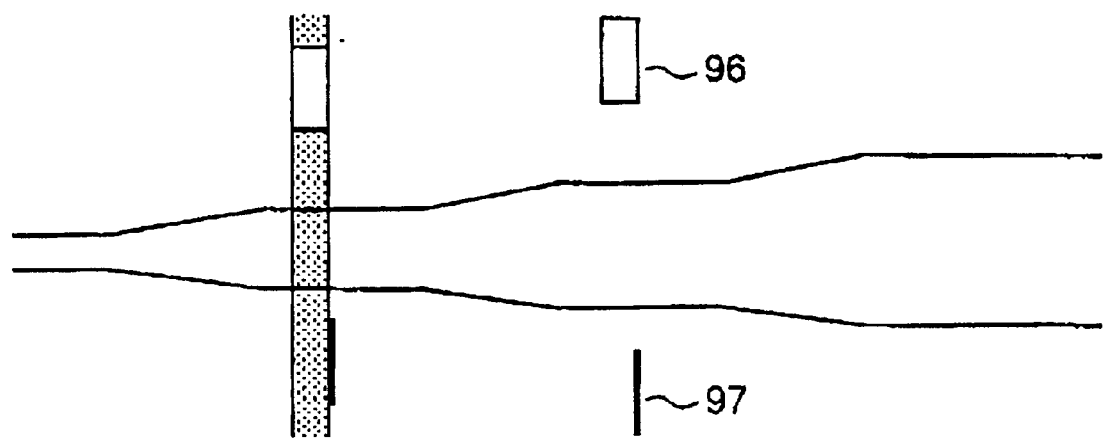
FIGS. 31A–31B show third examples of markers of the planar lightwave circuit of the present invention.
Figure 31B:
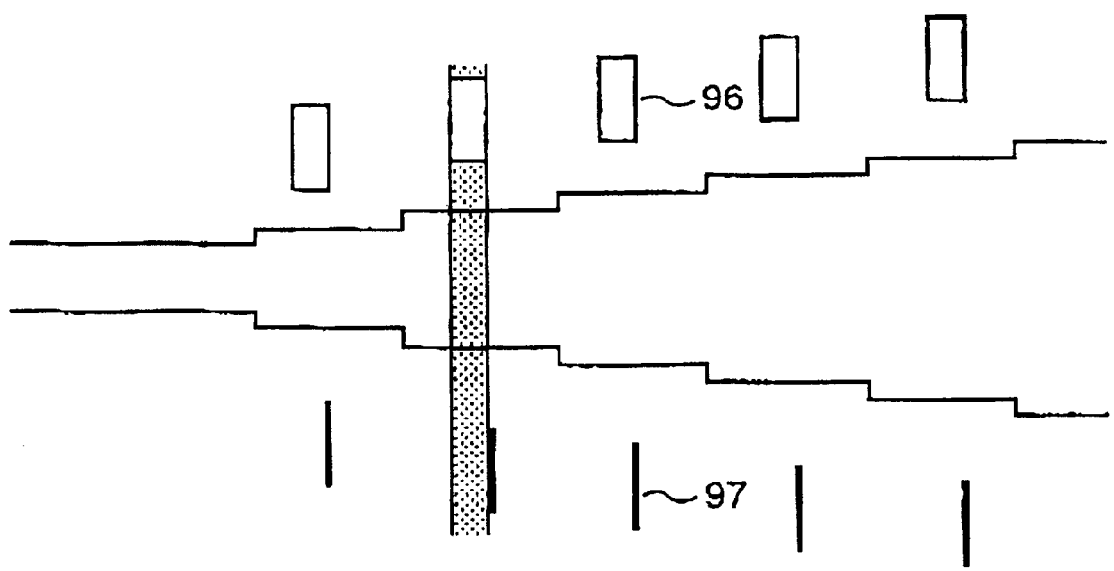

FIGS. 31A–31B show a third example of the markers where the width of a marker 96 of the upper side is the same as cutting width and a marker 97 of the lower side indicate an end face position after cutting. Accordingly, cutting can be performed in consideration of cutting width.

Figure 32A:
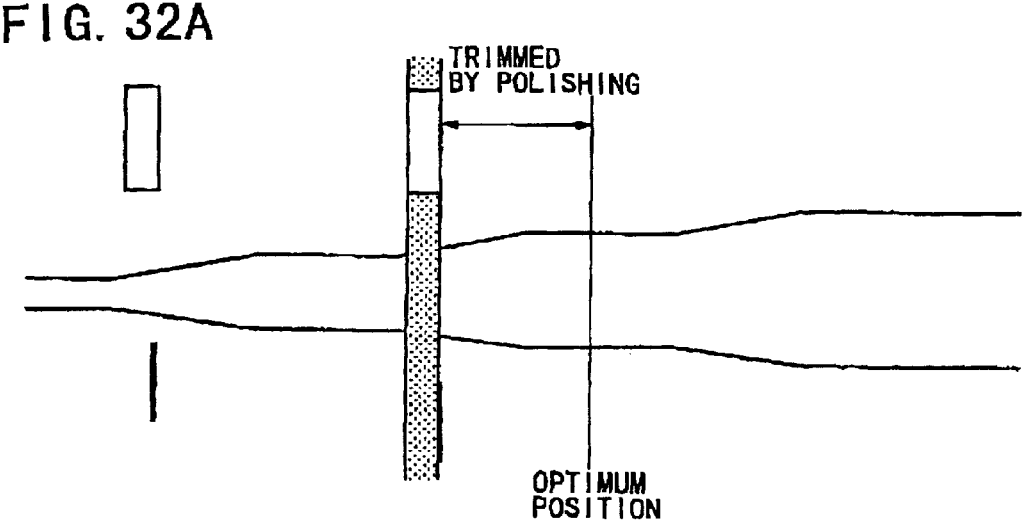
FIGS. 32A–32B show fourth examples of markers of the planar lightwave circuit of the present invention.
Figure 32B:
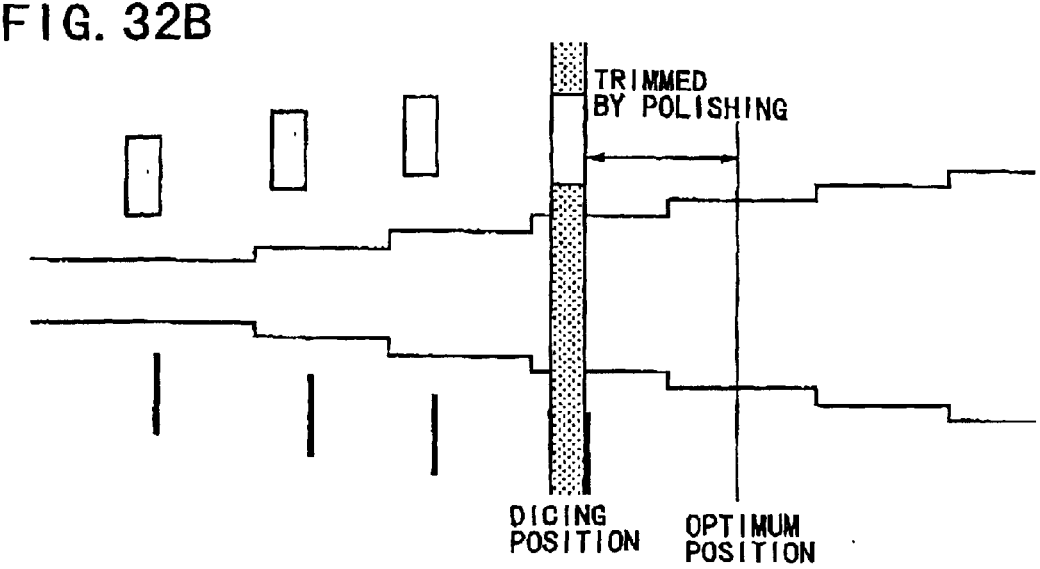

FIGS. 32A and 32B show a fourth example of the markers. The fourth example is almost the same as the third example shown in FIGS. 31A and 31B. The difference is that the markers are placed in consideration of the amount which is trimmed due to mechanical polishing.

In the spotsize converter of the present invention, a curve shape such as an exponential and a parabola can be used as the taper part in addition to the shape where the core width changes linearly. For example, an optimized taper which is proposed in "Soon Ryong Park and Beom-hoan, "Novel Design Concept of Waveguide Mode Adapter for Low-Loss Mode Conversion", IEEE PHOTONICS TECHNOLOGY LETTERS, VOL.13, NO.7, JULY 2001, pp.675–677" can be used as the taper shape of the core width converting part shown in FIG. 18 for example. Accordingly, the coupling loss can be further decreased. The optimized taper can be also used for the core width fine-tuning part.

Although the embodiments of the present invention have been described by taking the planar lightwave circuit as an example, application of the spotsize converter of the present invention is not limited to the planar lightwave circuit. For example, the spotsize converter can be applied to any optical circuit such as an optical circuit in which optical circuits or waveguides are multilayered. The "optical circuit" in this specification is used for meaning general optical circuit which is not limited to the planar lightwave circuit or the waveguide type optical circuit like AWG.

Although the main object of the present invention is to decrease the coupling loss between an optical waveguide and an optical fiber, the coupling loss also can be decreased when an optical component which is formed by a waveguide type optical circuit such as semiconductor laser is connected to the optical fiber or the planar lightwave circuit by using the optimum core width. In addition, the present invention can be used when different optical circuits are connected with each other.

According to the planar lightwave circuit of the present invention, the coupling loss of the superhigh-$\triangle$ waveguide can be decreased while downsizing the planar lightwave circuit. In addition, dicing error which may occur when dicing the substrate can be dissolved. In addition, even when fabrication error occurs, low coupling loss can always be obtained by selecting and using a port which has the optimum core width. Therefore, the planar lightwave circuits, especially, low loss and highly integrated planar lightwave circuits can be applied to an optical communication system efficiently. Thus, a large capacity optical communication system which is in increasing demand can be constructed.

The present invention is not limited to the specifically disclosed embodiments, and variations and modifications may be made without departing from the scope of the invention.

What is claimed is:

1. A planar lightwave circuit comprising:

an input waveguide and an output waveguide formed on a substrate herein each of said input waveguide and said output waveguide are formed by a core and a cladding which covers said core, and a refractive index of said core is higher than a refractive index of said cladding, wherein a core width of each of an input end side of said input waveguide and an output end side of said output waveguide decreases gradually toward an end face of said substrate, so that a spotsize of each of said input waveguide and said output waveguide is widened, wherein said core continues to said end face of said substrate, and wherein the core width at the end face of the substrate is W1, a core width at a position apart from the end face is W2, a length of a region where a core width decreases gradually toward an end face of the substrate is L, a mean taper angle θ in the region is defined as θ=tan$^{-1}$ (W2−W1)·(2L)$^{-1}$), and assuming that a dicing position error amount at an end of the substrate is x, the mean taper angle θ is determined such that a=x·tan θ is smaller than a permissible amount of a core width forming error.

2. The planar lightwave circuit as claimed in claim 1, wherein a taper part is formed in said core in each of said input end side of said input waveguide and said output end side of said output waveguide, and a taper angle of said taper part is larger than 0° and equal to or smaller than 5°.

3. The planar lightwave circuit as claimed in claim 1, wherein steps are formed in said core in each of said input end side of said input waveguide and said output end side of said output waveguide.

4. The planar lightwave circuit as claimed in claim 3, wherein a height between adjacent steps in said steps is larger than 0 μm and equal t or smaller than 5 μm.

5. The planar lightwave circuit as claimed in claim 1, wherein taper parts and straight parts are formed alternately in said core in each of said input end side of said input waveguide and said output end side of said output waveguide, core width of each of said taper parts changes gradually toward an end face of said substrate and a core width of each of said straight parts is constant.

6. The planar lightwave circuit as claimed in claim 5, wherein a length of each of said straight parts is equal to or larger than 1 μm.

7. The planar lightwave circuit as claimed in claim 1, wherein a marker is provided for indicating a cutting position of said input waveguide or said output waveguide, or indicating a position where said core width changes.

8. The planar lightwave circuit as claimed in claim 1, wherein said substrate is made of silicon and said input waveguide and said output waveguide are made of silica-based glass.

9. An optical circuit comprising:

a waveguide and a spotsize converter which is a part of said waveguide, wherein a core is embedded in a cladding in said waveguide, and said spotsize converter is located near an end face of a substrate on which said optical circuit is formed, said spotsize converter including alternating taper parts and straight parts, wherein a core width of said spotsize converter decreases gradually toward an end face of said substrate, so that a spotsize of said spotsize converter is widened, in which a core width of each of said taper parts decreases toward an end face of said substrate and a core width of each of said straight parts is constant, wherein said core of said spotsize converter continues to said end face of said substrate, and wherein the core width at the end face of the substrate is W1, a core width at a position apart from the end face is W2, a length of a region where a core width decreases gradually toward an end face of the substrate is L, a mean taper angle θ in th region is defined as θ=tan$^{-1}$ (W2−W1)·(2L)$^{-1}$), and assuming that a dicing position error amount at an end of the substrate is x, the mean taper angle θ is determined such that a=x·tan θ is smaller than a permissible amount of a core width forming error.

10. The optical circuit as claimed in claim 9, wherein an optimized taper is used as a shape of said taper part.

11. The optical circuit as claimed in claim 9, wherein a length of said straight part is equal to or larger than 1 μm.

12. The optical circuit as claimed in claim 9, wherein a mean taper angle θ of said spotsize converter is larger than 0° and equal to or smaller than 5°.

13. An optical circuit comprising:

a waveguide and a spotsize converter which is a part of said waveguide, wherein a core is embedded in a cladding in said waveguide, and said spotsize converter is located near an end face of a substrate on which said optical circuit is formed, wherein a core width of said spotsize converter decreases toward an end face of said substrate so that a spotsize of said spotsize converter is widened, and said spotsize converter includes a plurality of straight parts via steps in which a core width of each straight part is constant and a height of said step is larger than 0 μm and equal to or smaller than 5 μm, wherein said core of said spotsize converter continues to said end face of said substrate, and wherein the core width at the end face of the substrate is W1, a core width at a position apart from the end face is W2, a length of a region where a core width decreases gradually toward an end face of the substrate is L, a mean taper angle θ in the region is defined as θ=tan$^{-1}$ (W2−W1)·(2L)$^{-1}$), and assuming that a dicing position error amount at an end of the substrate is x, the mean taper angle θ is determined such that a=x·tan θ is smaller than a permissible amount of a core width forming error.

14. The optical circuit as claimed in claim 13, wherein a length of said straight part is equal to or larger than 1 μm.

15. The optical circuit as claimed in claim 13, wherein a mean taper angle θ of said spotsize converter is larger than 0° and equal to or smaller than 5°.

16. A planar lightwave circuit comprising:

an input waveguide and an output waveguide formed on a substrate, wherein each of said input waveguide and said output waveguide are formed by a core and cladding which covers said core, and a refractive index of said core is higher than a refractive index of said cladding; and a monitor waveguide in which an input end of said monitor waveguide is formed in an end face side of said substrate which is different from end face sides in which said input end of said input waveguide and said output end of said output waveguide are provided, wherein said monitor waveguide includes a core which is formed such that a core width changes toward an end face of said substrate, wherein a core width of each of an input end side of said input waveguide and an output end side of said output waveguide changes gradually toward an end face of said substrate.

17. A planar lightwave circuit comprising:
an input waveguide and an output waveguide formed on a substrate wherein each of said input waveguide and said output waveguide are formed by a core and a cladding which covers said core, and a refractive index of said core is higher than a refractive index of said cladding; and
a monitor waveguide, wherein an input end of said monitor waveguide is formed in an end face side of said substrate in which said input end of said input waveguide is located, and an output end of said monitor waveguide is formed in an end face side of said substrate in which said output end of said output waveguide is located, wherein shapes of an input end side and an output end side of said monitor waveguide are similar to said input end side of said input waveguide and said output end side of said output waveguide respectively;
wherein a core width of each of an input end side of said input waveguide and an output end side of said output waveguide decreases gradually toward an end face of said substrate, so that a spotsize of each of said input waveguide and said output waveguide is widened, and
wherein said core continues to said end face of said substrate, and optical fiber is connected to said end face when the planar lightwave circuit is used.

18. An optical circuit comprising:
a waveguide and a spotsize converter which is a part of said waveguide, wherein a core is embedded in a cladding in said waveguide, and said spotsize converter is located near an end face of a substrate on which said optical circuit is formed, said spotsize converter including a core width fine-tuning part in an end face side of said substrate, and a core width converting part which follows said core width fine-tuning part;
wherein a core width of said spotsize converter decreases gradually toward an end face of said substrate in each of said core width fine-turning part and said core width converting part so that a spotsize of said spotsize converter is widened, and a mean taper angle $\theta_1$ of said core width fine-tuning part is larger than 0° and smaller than a mean taper angle $\theta_2$ of said core width converting part, and
wherein said core of said spotsize converter continues to said end face of said substrate, and an optical fiber is connected to said end face when the optic circuit is used.

19. The optical circuit as claimed in claim 18, said core width fine-tuning part comprising a plurality of taper parts.

20. The optical circuit as claimed in claim 18, said core width fine-tuning part comprising alternating taper parts and straight parts, a core width of each straight part being constant.

21. The optical circuit as claimed in claim 18, said core width fine-tuning part comprising:
a plurality of straight parts via steps, a core width of each straight part being constant;
wherein a height of each of said steps is larger than 0 $\mu$m and equal to or smaller than 5 $\mu$m.

22. The optical circuit as claimed in claim 18, wherein an optimized taper is used as a shape of said core width converting part.

23. The optical circuit as claimed in claim 18, wherein a mean taper angle $\theta_1$ of said core width fine-tuning part is larger than 0° and equal to or smaller than 0.40°, and a mean taper angle $\theta_2$ of said core width converting part is larger than 0.40° and equal to or smaller than 5°.

24. The optical circuit as claimed in claim 18, wherein a marker for forming an end face of said substrate is provided in said optical circuit.

25. The optical circuit as claimed in claim 24, wherein said marker is provided in a location corresponding to a location in which a shape of said core width fine-tuning part changes.

26. The optical circuit as claimed in claim 18, wherein a monitor waveguide is provided on said substrate, said monitor waveguide including a second spotsize converter that includes:
a second core width fine-tuning part in an end face side of said substrate; and
a second core width converting part which follows said second core width fine-tuning part;
wherein a core width of said second spotsize converter is a minimum at an end face of said substrate, a mean taper angle $\theta_1$ of said second core width fine-tuning part is larger than 0° and smaller than a mean taper angle $\theta_2$ of said second core width converting part.

27. The optical circuit as claimed in claim 18, further comprising:
a first monitor waveguide, wherein said first monitor waveguide includes a first spotsize converter in an end face side of said substrate which is different in end face sides corresponding to an input end or an output end of said waveguide, said first spotsize converter including:
a first core width fine-tuning part in an end face side of said substrate, and
a first core width converting part which follows said first core width fine-tuning part,
wherein a core width of said first spotsize converter is a minimum at an end face of said substrate, and a mean taper angle $\theta_1$ of said first core width fine-tuning part is larger than 0° and smaller than a mean taper angle $\theta_2$ of said first core width converting part;
a second monitor waveguide, wherein said second monitor waveguide includes a second spotsize converter in an end face side of said substrate where an input end or an output end of said waveguide is located, said second spotsize converter including:
a second core width fine-tuning part in an end face side of said substrate, and
a second core width converting part which follows said second core width fine-tuning part,
wherein a core width of said second spotsize converter is a minimum at an end face of said substrate, and a mean taper angle $\theta_1$ of said second core width fine-tuning part is larger than 0° and smaller than a mean taper angle $\theta_2$ of said second core width converting part.

28. The optical circuit as claimed in claim 18, wherein sad substrate is made of silicon and said waveguide is made of silica-based glass.

29. The optical circuit as claimed in claim 18, wherein said waveguide is a monitor waveguide.

30. An optical circuit comprising:
a waveguide and a spotsize converter, which is a part of said waveguide, wherein a core is embedded in a cladding in said waveguide, and said spotsize converter is located near an end face of a substrate on which said optical circuit is formed, said spotsize converter including:

a core width fine-tuning part in an end face side of said substrate, and a core width converting part which follows said core width fine-tuning part, wherein a core width of said spotsize converter is a minimum at an end face of said substrate, and a mean taper angle $\theta_1$ of said core width fine-tuning part is larger than 0° and smaller than a mean taper angle $\theta_2$ of said core width converting part;

a monitor waveguide provided on said substrate, said monitor waveguide including a second spotsize converter that includes:

a second core width fine-tuning part in an end face side of said substrate, and a second core width converting part which follows said second core width fine-tuning part, wherein a core width of said second spotsize converter is a minimum at an end face of said substrate, and a mean taper angle $\theta_1$ of said second core width fine-tuning part is larger than 0° and smaller than a mean taper angle $\theta_2$ of said second core width converting part;

wherein said optical circuit includes a plurality of said monitor waveguides, and spotsize converters of said monitor waveguides are shifted to each other by a predetermined distance in a direction of a length of said monitor waveguides.

31. An optical circuit comprising: input ports and output ports, each of said input ports and said output ports including:

a waveguide and a spotsize converter which is a part of said waveguide, wherein a core is embedded in a cladding in said waveguide, and said spotsize converter is located near an end face of a substrate on which said waveguide is formed, said spotsize converter including:

a core width fine-tuning part in an end face side of said substrate, and a core width converting part which follows said core width fine-tuning part;

wherein a core width of said spotsize converter decreases gradually toward an end face of said substrate in each of said core width fine-tuning part and said core width converting part so that a spotsize of said spotsize converter is widened, and a mean taper angle $\theta_1$ of said core width fine-tuning part is larger than 0° and smaller than a mean taper angle $\theta_2$ of said core width converting part, and wherein said core of said spotsize converter continues to said end face of said substrate, and an optical fiber is connected to said end face when the optical circuit is used.

* * * * *